Figure 23:
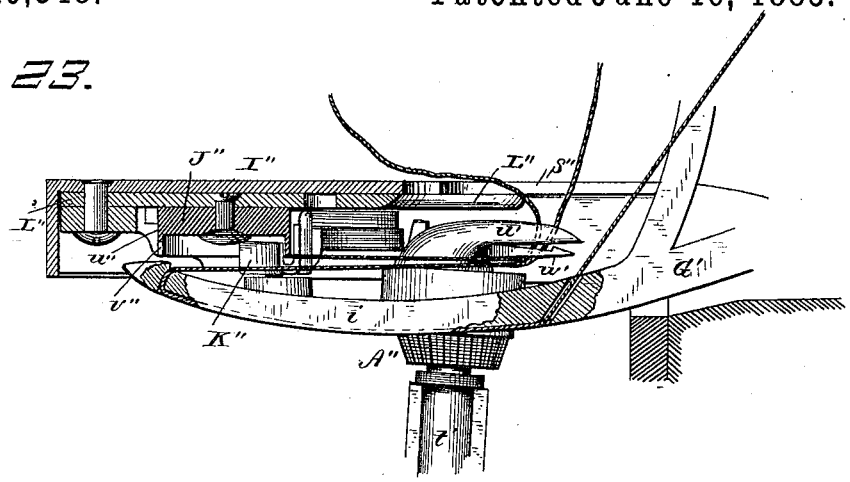

(Model.)
12 Sheets—Sheet 1.
J. F. GORDON.
GRAIN BINDING MACHINE.
No. 320,348. Patented June 16, 1885.
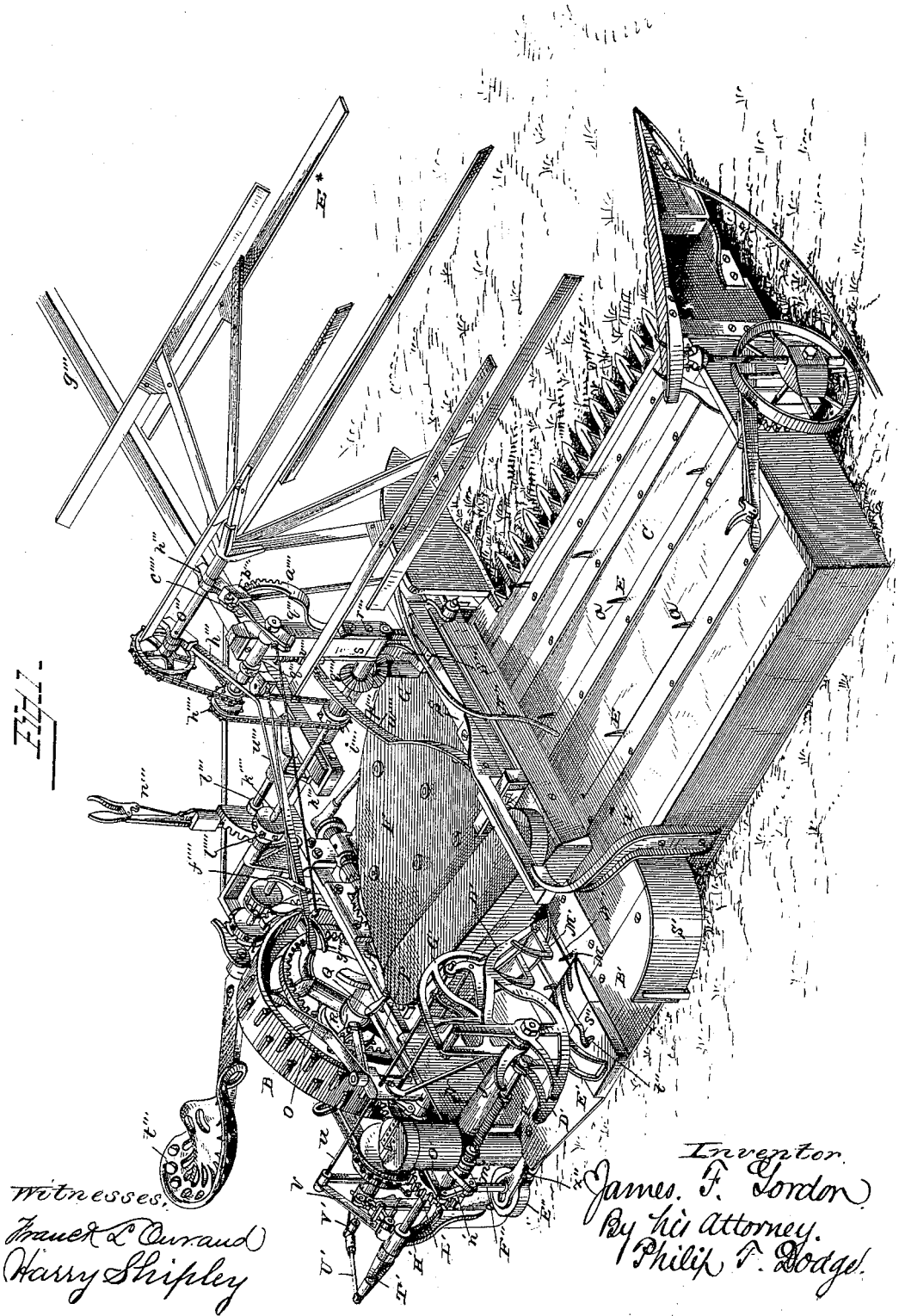
Witnesses:
Franck L. Durand
Harry Shipley
Inventor.
James F. Gordon
By his Attorney.
Philip T. Dodge.
N. PETERS, Photo-Lithographer, Washington, D. C.

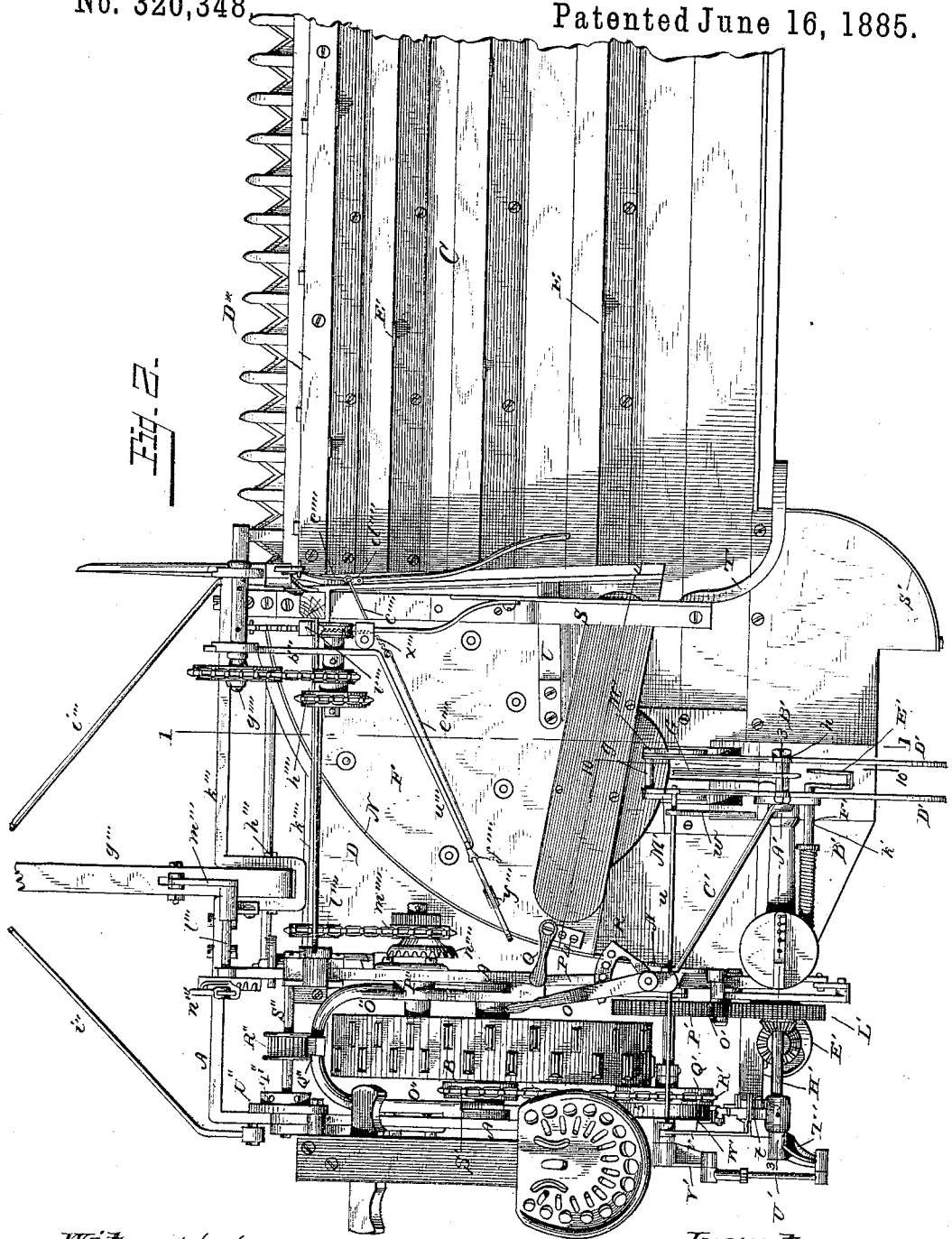

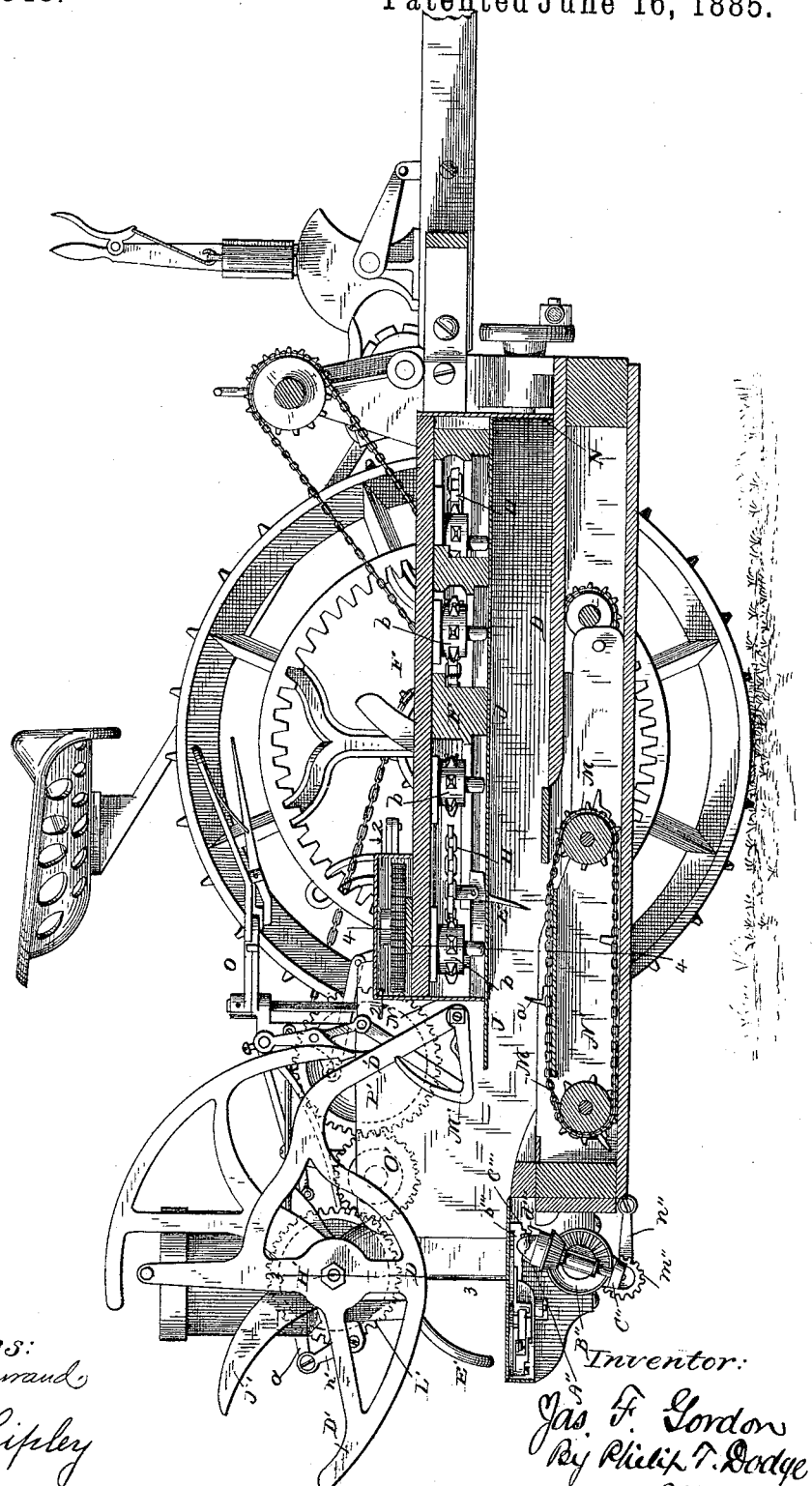

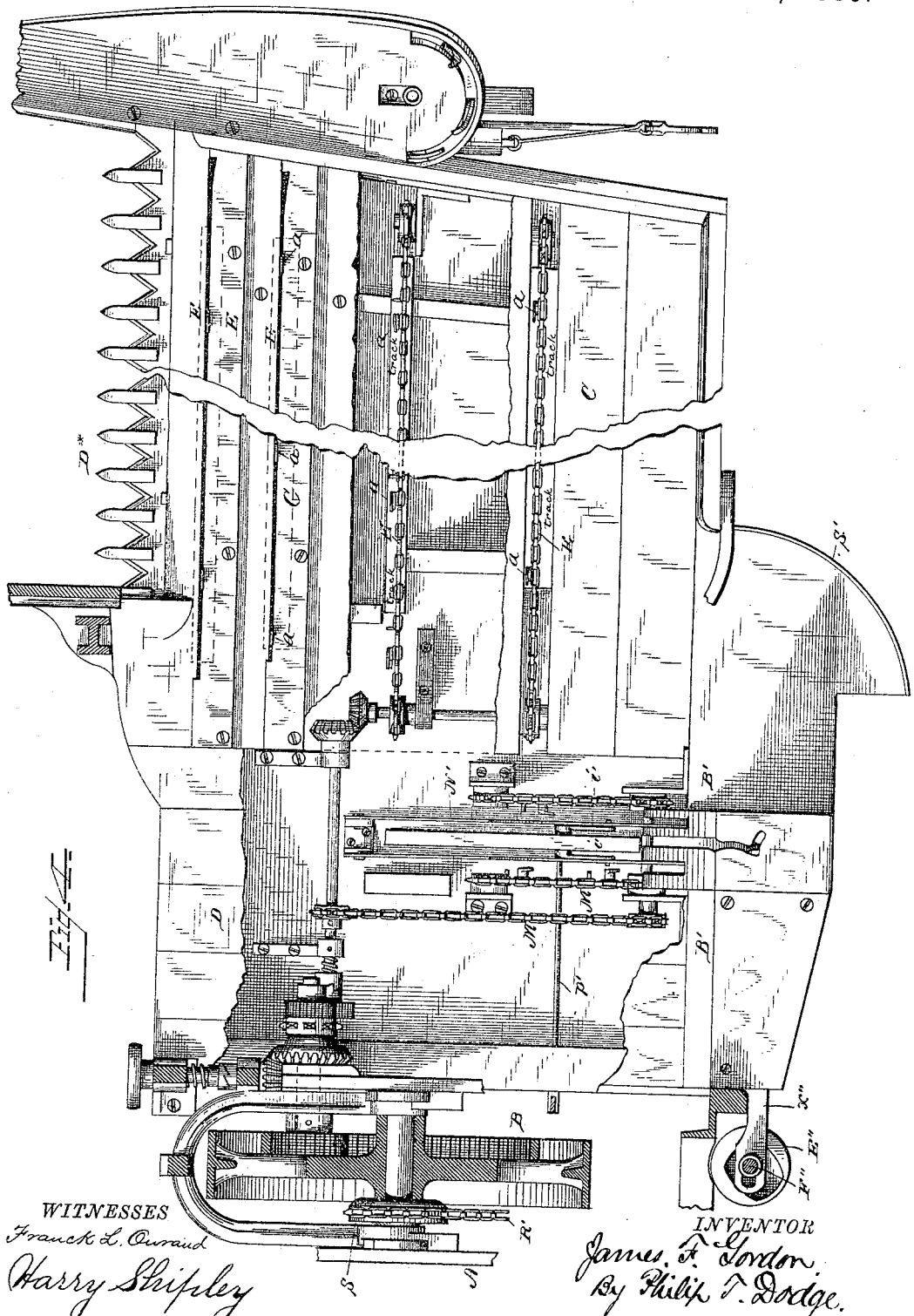

(Model.)   12 Sheets—Sheet 5.
J. F. GORDON.
GRAIN BINDING MACHINE.
No. 320,348.   Patented June 16, 1885.
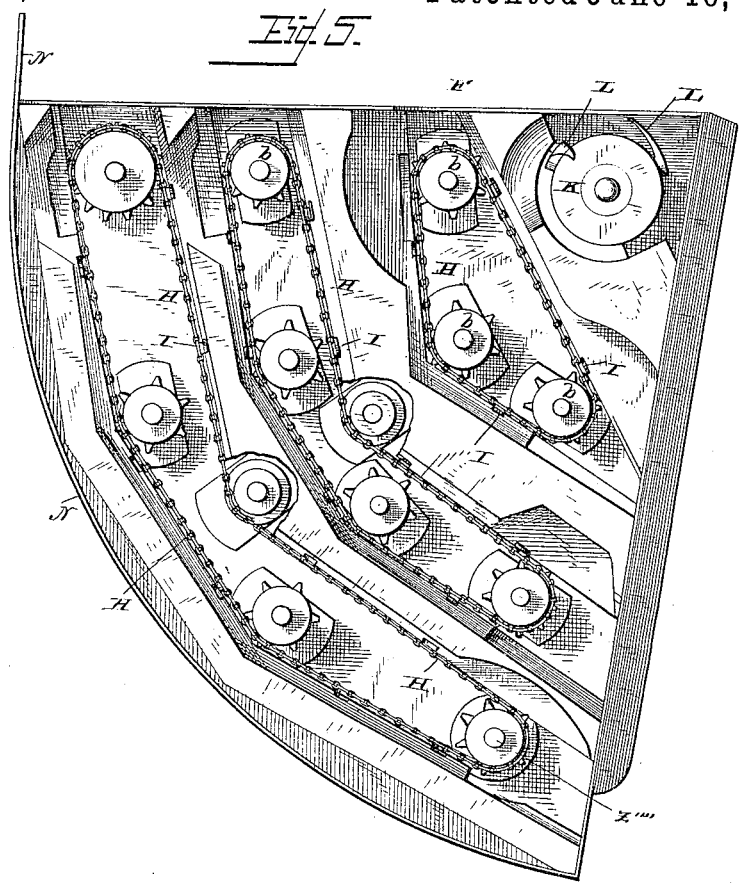
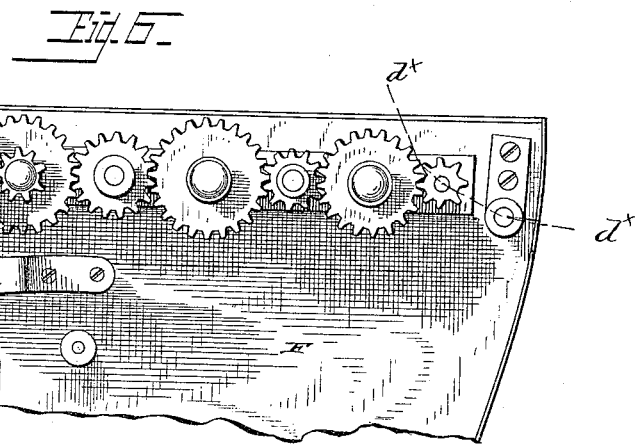
WITNESSES
Franck L. Ourand.
Harry Shipley
INVENTOR
James F. Gordon
By Philip T. Dodge
Attorney

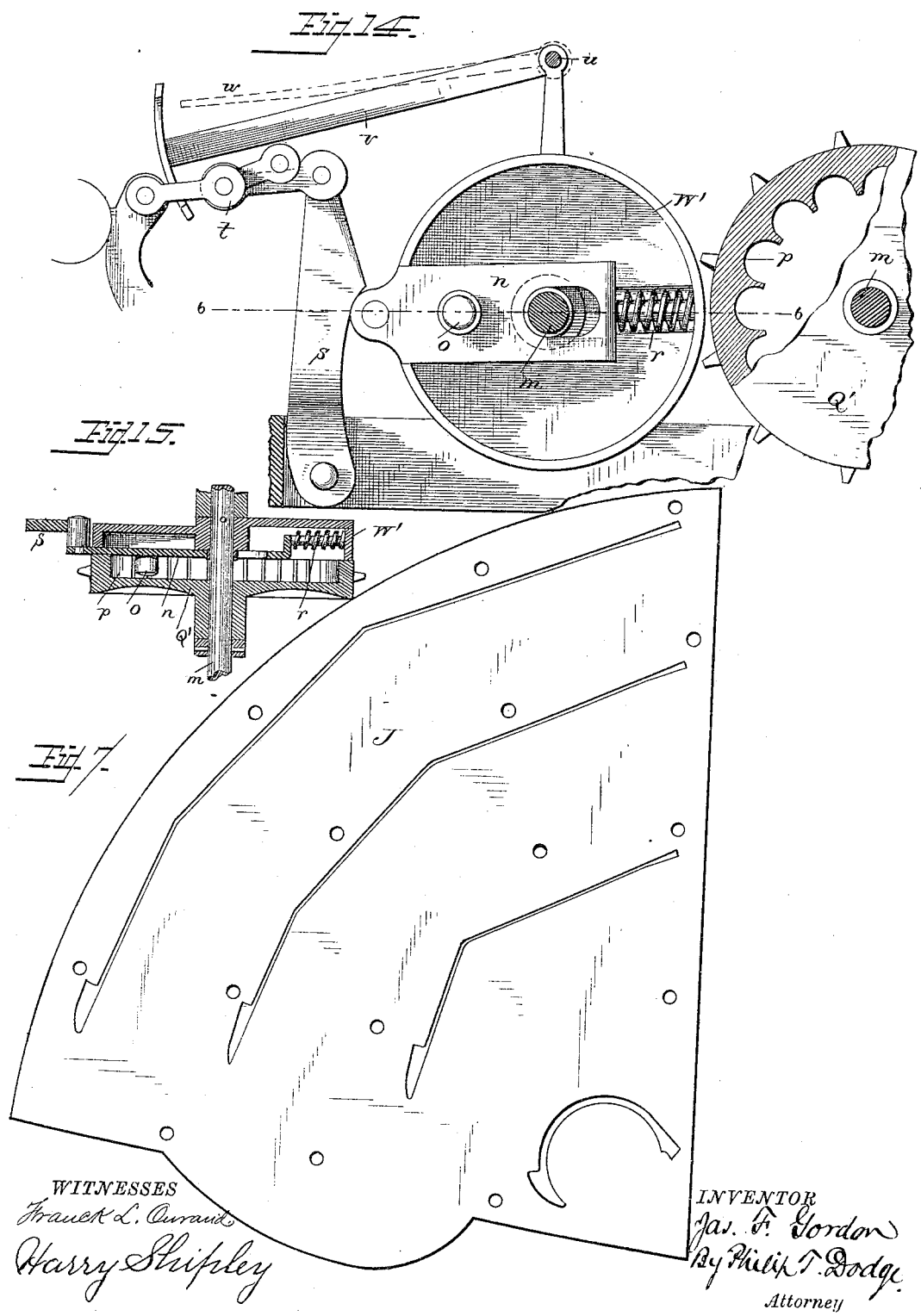

(Model.)
J. F. GORDON.
GRAIN BINDING MACHINE.
No. 320,348.  Patented June 16, 1885.
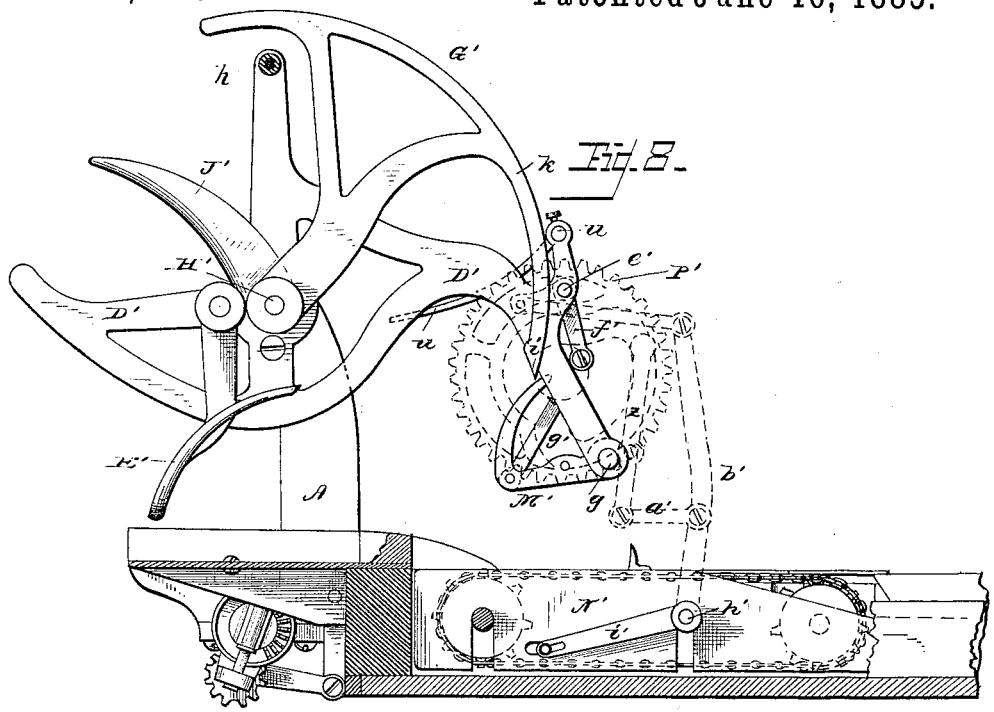
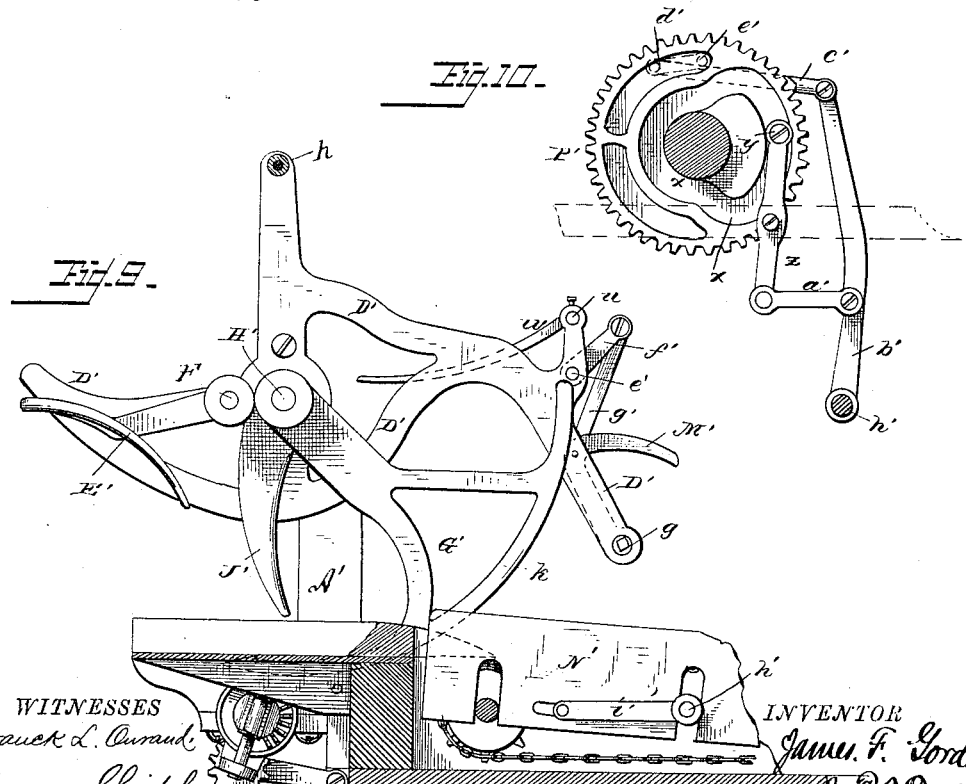
WITNESSES
Franck L. Ourand
Harry Shipley
INVENTOR
James F. Gordon
By P. T. Dodge.
Attorney

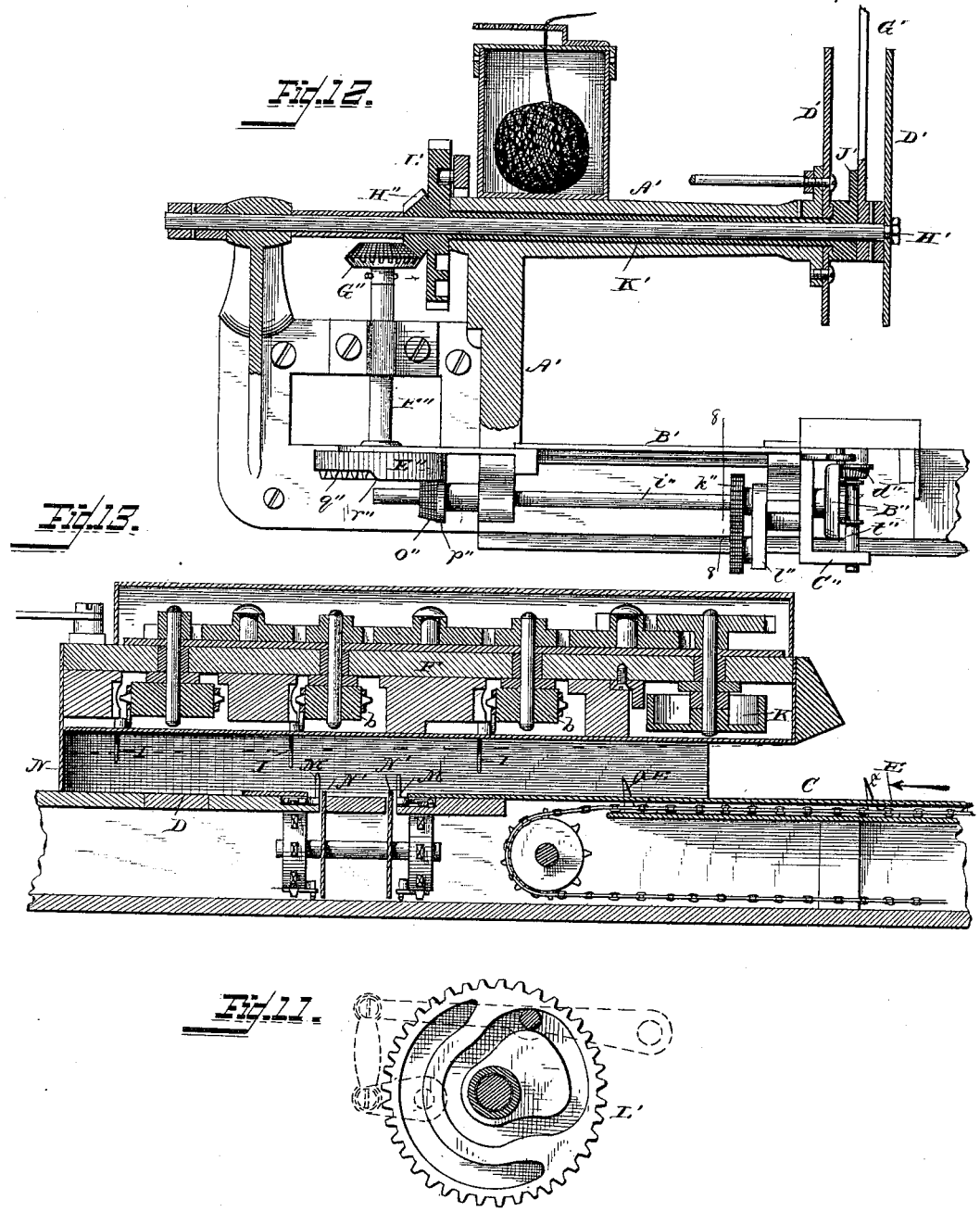

(Model.)
12 Sheets—Sheet 9.
J. F. GORDON.
GRAIN BINDING MACHINE.
No. 320,348. Patented June 16, 1885.
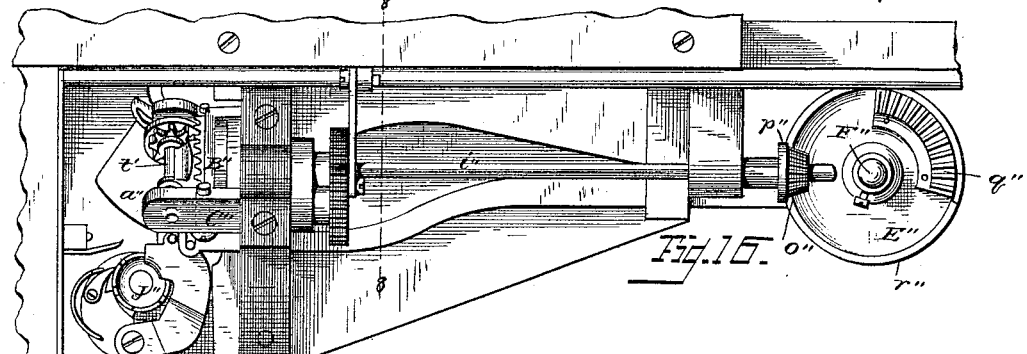
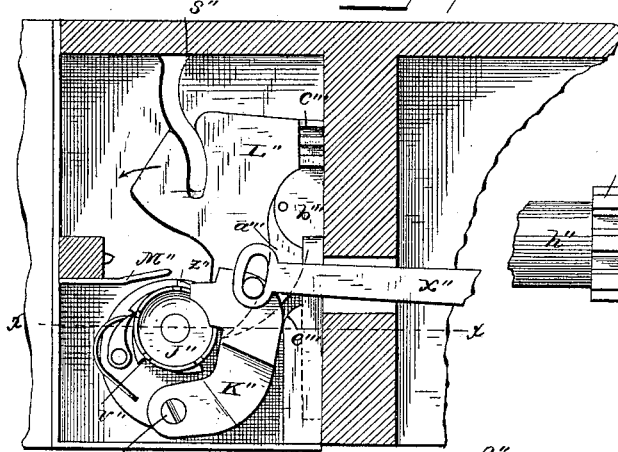
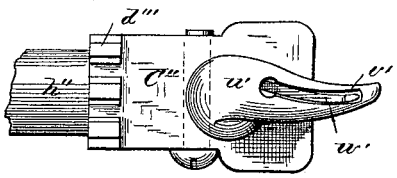
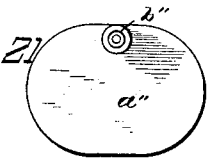
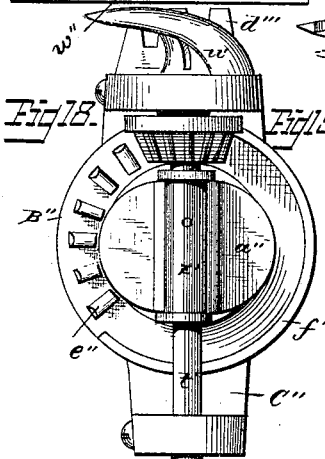
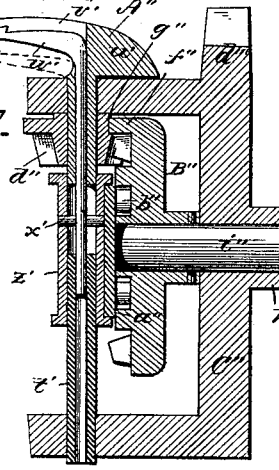
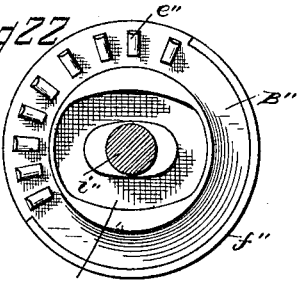
WITNESSES
Franck L. Ourand
Harry Shipley
INVENTOR
James F. Gordon
By P. T. Dodge
Attorney (Model.)

12 Sheets—Sheet 10.

J. F. GORDON.
GRAIN BINDING MACHINE.

No. 320,348.　　　　　　　　Patented June 16, 1885.

WITNESSES
Franck L. Ourand
Harry Shipley

INVENTOR
James F. Gordon
Philip T. Dodge.
Attorney (Model.)

J. F. GORDON.
GRAIN BINDING MACHINE.

No. 320,348. Patented June 16, 1885.

WITNESSES
Franck L. Ourand
Harry Shipley

INVENTOR
James F. Gordon
By Philip T. Dodge.
Attorney (Model.)
12 Sheets—Sheet 12.
J. F. GORDON.
GRAIN BINDING MACHINE.
No. 320,348. Patented June 16, 1885.
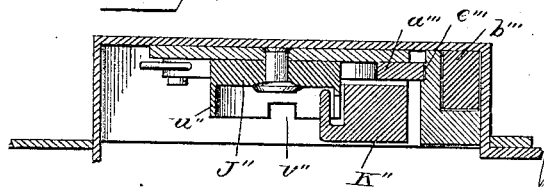
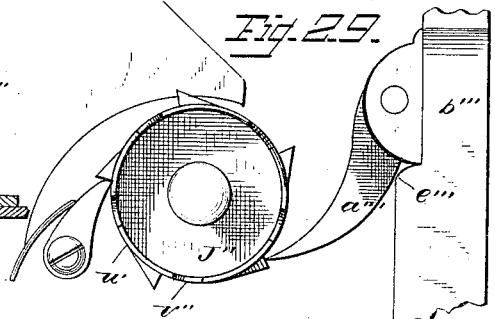
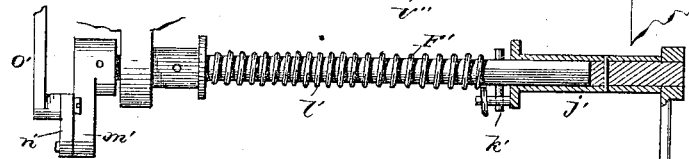
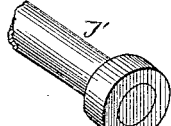
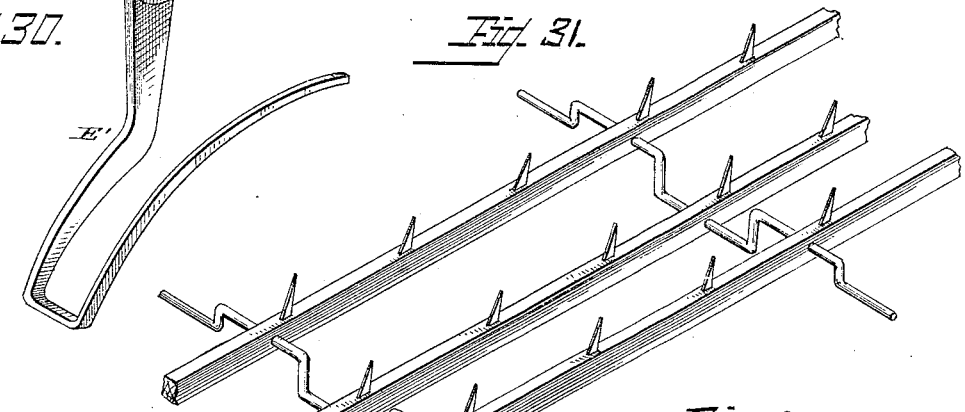
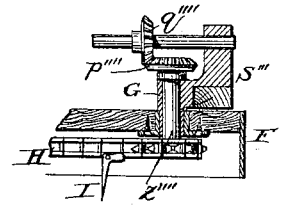
WITNESSES
Franck L. Ourand
Harry Shipley
INVENTOR
James F. Gordon,
By Philip T. Dodge.
Attorney

UNITED STATES PATENT OFFICE.

JAMES F. GORDON, OF ROCHESTER, NEW YORK.

GRAIN-BINDING MACHINE.

SPECIFICATION forming part of Letters Patent No. 320,348, dated June 16, 1885.

Application filed May 28, 1883. (Model.)

*To all whom it may concern:*

Be it known that I, JAMES F. GORDON, of Rochester, in the county of Monroe and State of New York, have invented certain Improvements in Grain-Binding Machines, of which the following is a specification.

My invention relates to that class of automatic harvesting and binding machines which are known in the art as "low-level" or "platform" binders, wherein the grain is delivered to the binding mechanism and the bound bundles discharged from the machine without being elevated.

It is the special aim of my invention to produce a light machine which shall be simple in construction, compact in form, and capable of being operated with a moderate expenditure of power, and which shall, at the same time, be adapted to bind perfectly grain varying in length and condition.

My improved machine embraces a horizontal frame sustained at one side by a single main wheel, from which motion is communicated to the various operative parts, and sustained at the outer or grain side by a second ground-wheel, the entire machine being adapted to rock backward and forward upon these wheels to vary the elevation of the cutter. A horizontal grain-receiving platform is located at the outer or grain side of the machine, to operate in connection with an ordinary cutting mechanism and reel. Longitudinal conveyers located in or upon the grain-receiving platform carry the grain to its inner end, where it is received by secondary conveying mechanism, which has the effect of turning the grain horizontally until it lies in a position at right angles to that in which it first fell upon the machine, after which it is carried backward into the binding mechanism. The binding mechanism is located in rear of the main wheel at a point between the main wheel and the inner end of the main platform, the space between the wheel and platform being occupied by a secondary platform or table, upon which the grain is turned and carried to the binder, as before referred to. The binding mechanism embraces a vibratory compressor, a vibratory binding arm or needle, by which the grain is packed against the compressor and encircled with cord, a rotary eject-or-arm, by which the bound bundle is delivered, and a tying mechanism of peculiar construction, by which the fastening of the applied band is effected.

Figure 24:
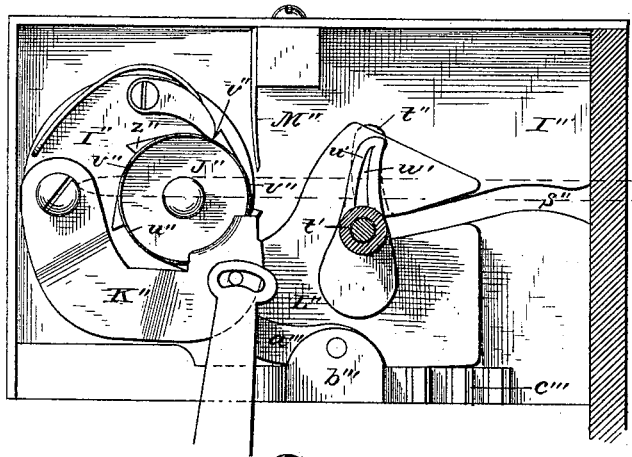
Figure 25:
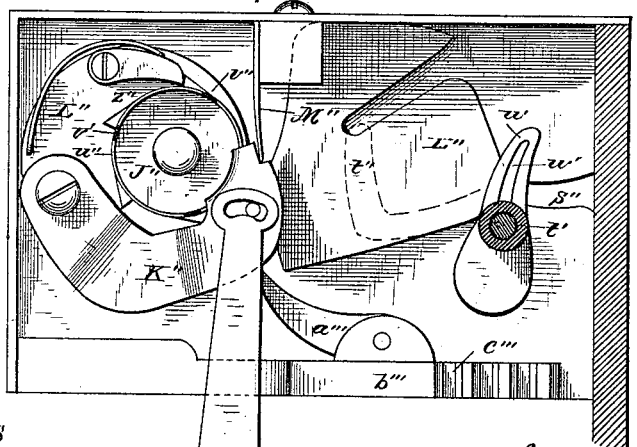
Figure 26:
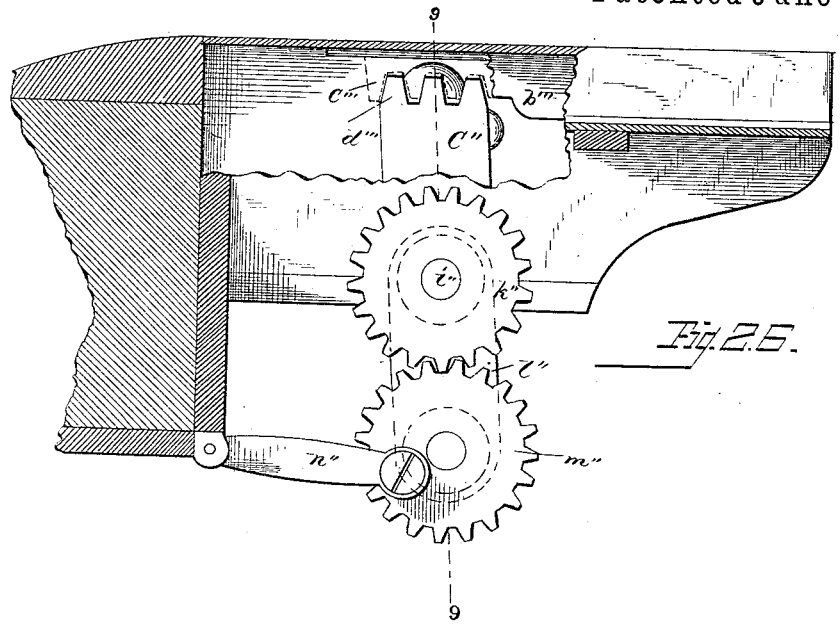
Figure 27:
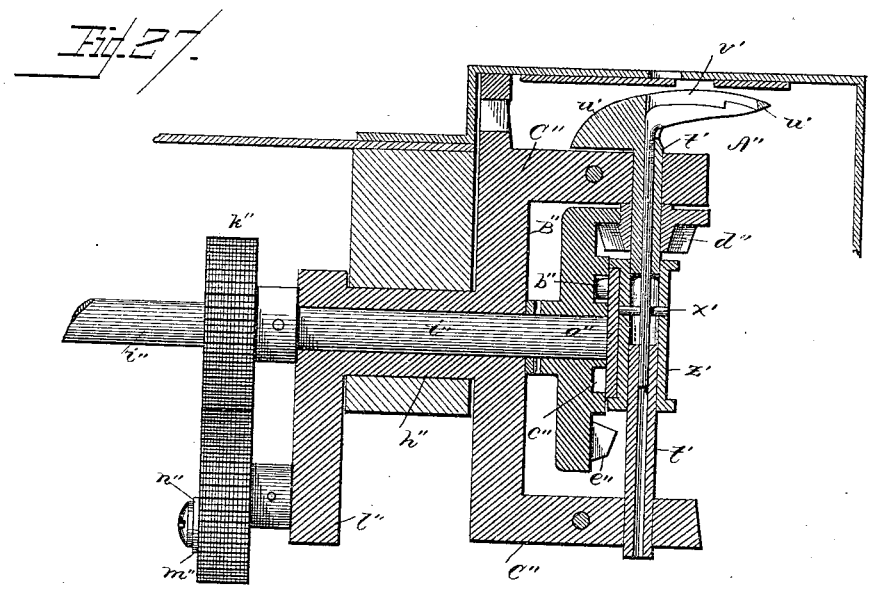

Referring to the accompanying drawings, Figure 1 represents a perspective view of my improved harvesting and binding machine, looking from the rear side. Fig. 2 represents a top plan view of the same, the outer end of the platform, which has no connection with the present invention, being removed to reduce the size of the figure. Fig. 3 is a vertical cross-section of the machine from front to rear on the line 1 1 of Fig. 2. Fig. 4 is a horizontal section of the machine on a plane in line with the axis of the main wheel, portions of the main platform and other parts being broken away, as will be hereinafter more fully explained, to expose to view parts which are ordinarily concealed. Fig. 5 is a view of the inside of the overhead conveyer used for turning the grain between the main platform and the binder, the view illustrating this conveyer as it appears upon looking upward against the same, with the face-plate removed to show the conveyer-chains and their actuating-pulleys. Fig. 6 is a top plan view of the gearing by which the motion is imparted to the chains of the conveyer illustrated in the preceding figure, this view being taken on the line 2 2 of Fig. 3, looking downward. Fig. 7 is a view of the shield or face plate used on the under side of the conveyer represented in Fig. 5. Fig. 8 is a vertical section through the binding mechanism from front to rear on the line 10 10, Fig. 2, the parts being in the position which they occupy during the accumulation of the gavel. Fig. 9 is a similar view with the parts in the position which they occupy at the instant of the discharge of the bound bundle. Fig. 10 is a side view of the geared cam-wheel and connections for imparting motion to the devices controlling the flow of grain from the conveyers into the binder. Fig. 11 is a similar view of the cam-wheel and connections by which the compressor and ejector arms are operated. Fig. 12 is a vertical cross-section through the binding-machine on the lines 3 3, Figs. 2 and 3. Fig. 13 is a vertical cross-section through the conveying mechanism on the line 4 4, Figs. 2 and 3, illustrating the relation of the several conveyers. Fig. 14 is a vertical section, on the line 5 5 of Fig. 2, through the clutch mechanism by which the binder is driven. Fig. 15 is a horizontal section of the same on the line 6 6, Fig. 14. Fig. 16 is a bottom plan view of the cord tying, holding, and cutting mechanism. Fig. 17 is a similar view of the cord clamping and cutting device on an enlarged scale. Fig. 18 is a side view of the tying-bill and the parts by which it is rotated and opened and closed. Fig. 19 is a vertical central section of the same on the line 7 7. Fig. 20 is an end or top view of the tying-bill. Figs. 21 and 22 are views of the cam-wheel and plate by which the rotary and the opening and closing motions are imparted to the tying-bill. Fig. 23 is a vertical section through the cord tying, holding, and severing mechanism, with the binder-arm and cord in the position in which they appear immediately after the cord has encircled the gavel and before the rotation of the tying-bill has commenced. Figs. 24 and 25 are bottom plan views illustrating the position of the various parts of the cord tying, cutting, and holding devices at the time of the commencement and of the completion of the knot, respectively. Fig. 26 is a vertical cross-section on the line 8 8, Fig. 12, showing the device by which the rocking motion is imparted to the tying-bill. Fig. 27 is a vertical section through the same on the line 9 9, Fig. 26. Figs. 28 and 29 are respectively a vertical and a horizontal section through the cord cutting and clamping device. Fig. 30 is a perspective view of the compressor-arm. Fig. 31 is a perspective view illustrating a modified form of conveyer which may be employed in the harvester-platform as a substitute for the toothed chains. Fig. 32 is an elevation, partially in section, of the compressor-arm and the operating devices connected immediately therewith. Fig. 33 is a vertical section on the line $d^\times$ $d^\times$, Fig. 6, through the axis of the overhead conveyer-frame, illustrating the manner in which the driving-shaft of the conveyer-chains is passed through the axis of the frame.

Referring to the accompanying drawings, A represents a rectangular main frame, sustained and carried by a central ground-wheel, B, which serves to transmit motion to the various operative parts. This wheel is connected adjustably with the frame, as hereinafter described, and serves as a pivot upon which the entire machine may be rocked forward and backward.

C represents the rectangular or substantially rectangular grain-receiving platform, which may be of any ordinary or approved construction. This platform is connected with the main frame A by intermediate frame-work or supports of any suitable character, whereby the two are rigidly united. The inner end of the grain-receiving platform C terminates at a considerable distance from the main wheel, and the intermediate space is occupied by a secondary platform, D, flush with and forming a continuation of the platform C, in order to receive the grain therefrom.

The cutting mechanism $D^*$, of any ordinary or approved form, is located at the front of the grain-receiving platform and arranged to operate in connection with an overhead reel, $E^*$, for the purpose of cutting the grain and delivering the same backward upon and across the platform C in the ordinary manner. The operations of reeling and cutting the grain and delivering the same upon the platform are essentially the same as in the machines now in general use, and constitute no part of this invention.

For the purpose of delivering the cut grain which falls across the platform C from front to rear at the inner end of said platform, preparatory to its being transferred to the binder, I make use of longitudinal conveyers E, located in or beneath the platform. These conveyers consist in the present instance, as shown in Figs. 1, 4, and 13, of horizontal endless chains carried over sustaining pulleys at their ends and provided with angular folding teeth $a$, the points of which are caused to rise through slots in the platform and project above its upper surface as they travel toward the inner end of the same. These conveyers are, with the exception of certain minor details hereinafter described, of essentially the same character as others now in general use, and need not at this time be more fully described. As shown in the several figures, the conveyers E lie parallel with each other and with the cutter-bar, and are made each of greater length than the one in its rear. The conveyer-chains may be of the same or of different lengths; but in either case the usual tracks or devices for elevating the teeth will be so arranged that the teeth of each chain travel in an operative position a greater distance than the teeth of the chain next in its rear. In other words, the teeth of the foremost conveyer move inward past the inner end of the cutter-bar and grain-receiving platform a greater distance than the teeth of the chain next in rear, the teeth of the second move inward a greater distance than those of the third, and so on throughout the series. This will be readily understood on reference to Fig. 4. The effect of this arrangement is to cause the butts of the grain lying near the front of the platform to be carried inward farther than the heads, so that the grain, upon being delivered from the inner end of the platform C upon the secondary platform, D, is turned or given a partial rotation in a horizontal plane thereon, so as to lie obliquely across the same.

The arrangement of the conveyers so that those at the front carry the grain a greater distance than those at the rear is an important feature of my invention, in that it secures the delivery of the grain from the platform in such position that it may be the more readily carried to the binder by the secondary conveying devices, hereinafter explained.

As regards the conveyers made of different lengths, or arranged to cease their action at different points in the length of the platform, my invention is not restricted to the chains and teeth as herein represented. Any other approved form of conveying mechanism may be substituted in place of the chains, provided it possesses the peculiarity of action above described. One simple substitute for the chains is a series of toothed bars mounted upon crank-shafts, whereby they are caused to rise through the platform while advancing and descend while retreating, in the manner represented in Fig. 31.

The grain as delivered by the conveyers E lies upon the secondary platform D in a position oblique to the line of said conveyers and to the line of travel of the machine. The binding apparatus being located at the rear of the machine, as hereinafter described, it is necessary that the grain shall be turned horizontally upon the platform D until the stalks lie in a position substantially at right angles to that in which they first fell upon the machine—that is to say, in a position substantially at right angles to that in which the machine advances. This result may be accomplished by means of any suitable mechanism adapted to act thereon. I prefer, however, to employ for the purpose, as the most simple and satisfactory means at present known to me, a series of overhead chains, H, provided with depending teeth I, to act upon the grain from above, these chains being passed over guides, by which they are caused to pursue curved paths corresponding, approximately, with the arc through which the grain is to be turned. These chains, which I will call, for the sake of convenience, "secondary" conveyer-chains, are arranged in the present instance upon the under side of an elevated adjustable supporting-frame, F, as shown in Figs. 1, 2, 3, 5, and 13. This frame F, which is made in the form of a quadrant, is located above and parallel with the grain-platforms C and D, at a suitable distance therefrom to admit of the grain being carried beneath it. It is pivoted upon and sustained by a rigid post or journal, G, at its forward outer corner, this post arising from the main frame, and serving as a pivot upon which the frame F and its chains may swing horizontally for the purpose of effecting a longitudinal adjustment of the grain with respect to the binder, as hereinafter more fully explained. There may be any desired number of secondary conveyer-chains; but in the present instance I have represented three, as shown in Fig. 5. Each chain is carried by a series of sprocket-wheels, b, secured in the under side of the supporting-frame F, and disposed in such relation to each other as to cause the chains to follow curved lines, the paths of curvature corresponding, approximately, with concentric arcs described from the outer rear corner of the frame F as a center. In other words, the arrangement of the chains is such that their depending teeth will travel in curves corresponding with the path pursued by the different points in the length of the grain upon which they act during the operation of turning the grain around upon the secondary platform D. As shown in Figs. 3, 5, and 13, the depending teeth I are made of angular form, and extend during the forward motion downward through slots formed in a shield or face plate, J, applied to the under side of the overhead frame F, as represented in Figs. 3 and 7, the latter figure showing the plate detached. During the backward movement of the teeth their points are drawn inward above the plate or shield J and ride thereon, the teeth being in this position inactive.

For the purpose of imparting motion to the secondary conveyer-chains H any suitable mechanism may be employed. I prefer, however, to extend the journals of the sprocket-wheels at one end of the chains upward through the supporting-frame F to its upper side, and connect them with each other at the upper ends by means of a system of gearing, such as represented in Fig. 6, the various gears being so proportioned as to impart to the several chains different speeds, corresponding with the different distances at which they stand from the rear corner of the frame, which corner coincides, substantially, with the point or center around which the grain is to be carried. It will be readily understood that as the grain is carried around in the arc of a circle the butts move through a greater distance and at a greater speed than the heads, and that the arrangement of the chains to move at different speeds, as above described, is to compensate for this varying speed of the grain at different points.

As an additional means of turning the grain, I propose to locate at the outer rear corner of the overhead frame F a revolving head, K, provided with teeth L, arranged to drop through slots in the shield-plate during their forward motion, and to ride upward above the plate during their backward motion.

The parts being constructed as above described, the grain is delivered from the main platform by the carriers E beneath the elevated frame F, and is there acted upon from above by the depending teeth I, as before mentioned, whereby the grain is caused to sweep around horizontally until it has made a quarter of a revolution, or thereabout, and lies at right angles, or substantially so, to its original position. After being thus turned it is necessary in the present machine that the grain shall be carried directly backward over the secondary platform D into the binding mechanism at the rear. This movement of the grain I effect by means of two conveyers, M, located in the platform D parallel with each other, and extending backward in a direction at right angles to the primary conveyers E. The conveyers M have their chains provided with angular folding teeth similar to those employed in the main conveyers E, the teeth being arranged to rise through the platform and remain extended above the same during their backward movement, and to descend below the platform during their forward movement. In consequence of this action the conveyers M, acting upon the grain from beneath, carry the same from under the frame D and its secondary conveyers directly backward to the binding mechanism, which will be hereinafter explained.

In place of the chain conveyers M, toothed bars, such as shown in Fig. 31, or other conveying mechanism, may be substituted.

Inasmuch as the grain encountered in the field varies greatly in its length, and it is necessary that the band shall in all cases be applied as nearly as possible at the middle of the grain, it is customary in all automatic machines to provide means for shifting the grain endwise with respect to the binder, or vice versa. It is for this purpose that the frame F, containing the secondary overhead conveyers, is arranged to swing horizontally, as before explained. The forward outer side of the frame F is curved in the arc of a circle, or substantially so, corresponding with that through which the butts of the grain are carried as they are turned upon the table D. This curved edge is provided with a depending flange or rim, N, extending downward to the surface of the secondary platform D, and also extending backward beyond or in rear of the frame F, as plainly represented in Figs. 2, 3, 5, and 13. This depending flange serves as a guard or guide, against which the butts of the grain travel while being turned around by the secondary conveyer. It follows, therefore, that by adjusting the position of the frame F horizontally around its pivot G, the position of the flange N and the path of the conveyer-chains H may be altered in such manner as to deliver the grain at the rear of the platform D with its center at a given point, and this whether the grain be longer or shorter. In order to permit the driver to effect this adjustment of the grain-delivering mechanism without dismounting or stopping the motion of the machine, I mount upon the main frame, as shown in Fig. 2, a hand-lever, O, the vertical shaft of which carries an arm, P, connected by a link, Q, to the frame F. The lever O is provided with a latch arranged to engage in holes or notches in a rack-plate, R, by which means the lever and adjuster-frame F may be locked in different positions.

For the purpose of facilitating the entrance of the grain from the main platform C, beneath the overhead frame F, to the secondary conveyers, I give the outer edge of the frame F an upward inclination on the under surface, as shown in Fig. 13. In order that the grain when badly lodged or tangled may be the more readily compressed and handled, the under surface of the frame F may be given a downward inclination toward the rear edge of table D, as represented by dotted lines in Fig. 13. This downward inclination of the frame F on its under surface will also be of advantage, in that it will assist in disengaging the grain from the depending teeth toward the close of their action thereon.

For the purpose of giving increased rigidity to the overhead frame F, I extend across the main frame a horizontal bar, S, sustained at its forward end by a post rising from the main frame near the inner end of the cutter-bar, and sustained at its rear end by an arched arm or casting, T, as clearly shown in Figs. 1 and 2. A plate, U, secured to the upper side of the frame F, engages with and slides upon the bar S, thereby giving support to the frame F. It will be observed that the rear end of the bar S and the frame T, by which it is supported, rise above the platform in such manner as to admit of the heads of the grain passing freely thereunder.

Having thus described the means for delivering the cut grain at the rear of the secondary platform D, I will now describe the binding mechanism by which the grain is received and bound.

A standard or bracket, A', rising rigidly from the rear end of the main frame, has at its upper end an arm extending horizontally toward the grain side of the machine and overhanging the binding or grain-receiving table B', the latter located in rear of and forming a continuation of the secondary platform D. The upper extreme end of the overhanging standard A' is held firmly in position by means of a diagonal brace, C', bolted thereto, and extending thence forward obliquely to a rigid post or standard rising from the main frame. At the forward end of the overhanging bracket A' there are two stationary vertical plates, D' and D', overhanging the grain-table, the lower edges of these plates being given a curvature such as shown in Figs. 1, 3, 8, and 9, whereby they are adapted to act upon the upper surface of the accumulating gavel to assist in confining and compressing the same. As shown in the drawings, these stationary plates D' and D' are alike in form, and are located, as shown, parallel with each other at such distances apart as to admit of the binder, compressor, and ejector arms moving vertically between them. The plate nearest the standard A' is bolted firmly to its overhanging end, while the companion plate is sustained by means of the projecting binder-arm shaft, as hereinafter explained, and by means of cross-connections $g$ and $h$, connecting it with the other plate, as shown in Figs. 1 and 2. The upper connection, $h$, is made tubular, in order that it may serve as a guide for the binding-cord, as hereinafter explained, while the lower connection, $g$, consists of a rock-shaft for operating grain-confining arms, hereinafter explained. The two connections serve, jointly with the binder-arm shaft, to retain the plates D' rigidly in position. The grain to form the gavel is delivered in a continuous stream upon the binding-table B', beneath the plates D', by means of the conveyers M, before referred to.

For the purpose of affording a surface in rear of the gavel against which to compact the same, I provide a vertically-swinging compressor-arm, E', mounted on the end of the horizontal rock-shaft F', as shown in Figs. 1, 3, 8, 9, and 30, this rock-shaft being actuated by means which will be hereinafter described. For the purpose of passing the cord or other binding material around the accumulated sheaf and of assisting in the compression of the same, I provide a vertically-vibrating binder arm or needle, G', of the form represented most clearly in Figs. 1, 3, 8, and 9. This binder-arm is mounted between the stationary plates D', upon the end of the horizontal shaft H', passed through the upper overhanging end of the standard A', as plainly represented in Figs. 3, 8, 9, and 12. The arm is provided with an extending perforated point, $i$, to carry the cord around the gavel to the tying device, located beneath the binding-table, as hereinafter described. The inner or forward surface of the arm is curved, as shown in the drawings, to adapt it to assist in the formation and compression of the gavel, while its outer surface, $k$, is curved in the arc of a circle described from the shaft H' as a center, or in substantially said form, whereby it is adapted to hold back the advancing grain while separating the gavel therefrom, as in other machines well known in the art. The manner of imparting motion to the binder-arm shaft to cause the elevation and depression of the binder-arm will be hereinafter given in detail.

For the purpose of discharging the bound bundle from the machine I provide an ejector-arm J', arranged to revolve in a vertical plane between the stationary plates D', and past the side of the binder-arm. In its course of revolution this ejector-arm J' passes through the end of the compressor E', the end of which is curved or made in a U form, as clearly represented in Figs. 1 and 30, this construction of the compressor-arm being adopted in order to adapt it to bear upon the gavel on both sides of the band, the better to retain the gavel in position. The ejector arm J' is supported and driven by a tubular shaft, K', to which it is secured, this shaft surrounding the binder-arm shaft and passing through the overhanging end of the standard A', and being driven at its outer end by means of a wheel, L', as indicated in Figs. 1, 2, and 12.

From the description of the conveying mechanism heretofore described, it will be understood that it acts to deliver the grain continuously or in an unbroken stream toward the binder mechanism. Owing to this fact it becomes necessary to provide a means for enlarging, temporarily the grain-space outside of and adjacent to the binder-arm during the time that the arm is in its depressed position, as otherwise the parts would be subjected to undue strain. The means employed for this purpose consist of vertically-swinging arms M', pivoted to the forward ends of the stationary overhead plates D', as clearly represented in Figs. 1, 3, 8, and 9. The ends of the plates D' are extended toward the conveyers beyond the outside of the binder-arm, and are curved in such manner as to afford a considerable space beneath them and outside of the arm for the accumulation of the grain as it is delivered upon the platform or table from the conveyers M. During the time that the binder-arm is in an elevated position, and while the grain is being delivered thereunder to form the gavel, the arms M' are depressed to the position shown in Fig. 8, forming substantially horizontal guides, beneath which the grain is compelled to pass to the binding-table below the binder-arm. When, however, the binder-arm is depressed to separate and compress the gavel, the arms M' are elevated to the position represented in Fig. 9, thus affording the increased grain-space before alluded to. As the plates N' and arms M' are elevated at or about the same time, the parts will be relatively arranged as to size and movement as to secure the results above named. The manner of imparting motion to the arms M' will be hereinafter explained.

Owing to the fact, before alluded to, that the conveyers M remain constantly in motion, it is desirable that means shall be provided to prevent them from advancing the grain against the binder-arm during the time of its depression. For this purpose I employ two vertically-swinging plates, N', located in the secondary platform D, parallel with the conveyers M, and arranged to rise at the proper times above the level of the conveyer-teeth, so as to act upon the accumulating grain from below and lift the same clear of the conveying-teeth. It is to be understood that, notwithstanding the fact that the conveyers M are thus rendered momentarily inactive, the grain will continue to flow backward above the conveyers M and guards N', against the outside of the binder-arm, owing to the action of the other conveying mechanism of the machine; hence the necessity for the increased grain-space afforded by the elevation of the arms M'.

The driving mechanisms by which the compressor, ejector-arm, arms M, and plates N' are actuated are so timed and adjusted as to cause said mechanisms to operate with respect to each other in the following order: The compressor-arm E' is depressed and retained in position above the binding-table, and the binder-arm G' at the same time elevated to admit of the grain being passed thereunder. While the binder-arm and compressor remain in these positions, as shown in Fig. 8, the plates N' are depressed in such manner as to expose the teeth of the conveyer M, and the arms M' are also depressed for the purpose of holding the grain down to the action of the conveyers M. The relative positions of the parts at this time are plainly represented in Fig. 8. By the action of the conveying mechanism the grain is caused to flow forward in a continuous stream beneath the plates M', the binder-arm, and the stationary plates D', against the compressor E'. When a sufficient amount of grain has accumulated to form a gavel of the desired size, the binder-arm descends, to encircle the gavel with cord and present the end of said cord to the tying devices beneath the table, and at the same time the arms M' are elevated to afford the increased grain-space, and the plates N' elevated to lift the inflowing grain away from the teeth of the conveyer, as before explained. The continued descent of the binder-arm causes the same to effect the compression of the gavel, which is confined between the binder-arm, the compressor-arm, the lower edge of the plates D', and the upper surface of the table. Immediately after the binder-arm has completed its descent, and while it remains momentarily at rest, the tying mechanism unites the ends of the band, after which the compressor-arm E' is elevated to the position represented in Fig. 9, to permit the escape of the bound bundle from the rear edge of the machine. This discharge of the bundle is effected by the backward rotation of the ejector-arm J', which at this time passes backward beyond the binder-arm, as shown in Fig. 9. During or immediately after the action of the ejector-arm, which continues its rotation upward, the compressor is depressed, the binder-arm elevated, and the parts brought to the original positions represented in Fig. 8, preparatory to the binding of the next bundle.

I will now describe the mechanism by means of which the motions above described are imparted to the various parts, including the automatic device for tripping the driving mechanism into action automatically when the gavel has reached a predetermined size.

As before stated, the ejector-arm J', which revolves always in the same direction and makes a complete revolution during the binding of each bundle, is mounted upon a tubular shaft, K', extending through the upper end of the overhanging bracket and provided at the rear end with a driving-gear, L', secured firmly therein. As shown in Figs. 1, 2, and 12, the gear L' receives motion through an idle-pinion, O', on the frame from a gear-wheel, P', the latter being mounted on a horizontal shaft, as shown in Fig. 2, provided with a sprocket-wheel, Q', which receives motion through a chain, R', from a sprocket-wheel, S', mounted firmly upon the axle of the main ground-wheel B, from which it receives motion. The sprocket-wheel S' is connected with the main wheel by a pawl and ratchet, which admits of the main wheel turning backward independently of the binding mechanism and without imparting motion thereto. The sprocket-wheel Q' is connected to the shaft of the wheel P' by means of a clutch, W', which will be presently explained, and which admits of the entire binding mechanism standing at rest during the accumulation of the grain to form the gavel. The manner in which this clutch is operated automatically will be hereinafter described.

The binder-arm is secured rigidly to the end of its shaft H', which is passed, as before mentioned, and as illustrated in Fig. 12, centrally through the shaft of the ejector-arm, and provided at its rear end with a crank-arm, T', connected by a pitman, U', to a second and shorter crank-arm, V', secured rigidly to the end of the shaft which carries the gear-wheel P' and sprocket-wheel Q', as before referred to. Under this arrangement, which is clearly represented by Figs. 1 and 2, the rotation of the short crank V' causes a vibratory motion to be imparted to the crank T', and thereby to the binder-arm shaft and binder-arm, causing the binder-arm to swing upward and downward at the proper times independently of the ejector-arm.

As before intimated, the clutch W', through which the binder mechanism is driven, is thrown into and out of action automatically by the pressure of the accumulating gavel against a tripping device. This arrangement I will now describe, reference being had particularly to Figs. 1, 2, 3, 8, 10, 14, and 15.

The body of the clutch W', as shown in Figs. 14 and 15, consists of a disk or wheel secured rigidly upon the driving-shaft m, and recessed diametrically in one side to receive a radially-sliding dog or plate, n, which is consequently compelled to revolve therewith, and which carries upon one side a stud or roller, o. The adjoining sprocket-wheel, Q', which, it will be remembered, is loose upon the shaft m, is provided in its side face with a series of internal notches, p, to receive and engage with the stud o on the plate n. Upon pushing the plate n inward the stud o is disengaged from the notches of the sprocket-wheel Q', and the wheel is consequently permitted to revolve loosely upon the shaft and the binding mechanism to remain at rest. When, however, the plate n is moved outward, the roller, engaging with the teeth of the wheel Q', locks said wheel rigidly to the body of the clutch, causing the latter to turn therewith and transmit motion through the shaft m to the binder. A spring, r, is mounted within the body of the clutch and acts against the inner end of the plate or dog n, tending to force the same outward into engagement whenever it is released. Inasmuch, however, as it is required to have the binding mechanism stand normally at rest, I provide a means for holding the dog n ordinarily out of engagement. The means to this end, as plainly illustrated in Fig. 14, consists of an upright arm, s, pivoted at its lower end and acted upon at its upper end by means of a toggle-joint, t, this joint connecting the upper end of the lever with the frame, and serving, when straightened, to hold the lever forward in suitable position to encounter the end of the dog n and force the same inward. Whenever the toggle-joint is raised or bent, the lever s is permitted to fall back, thereby allowing the dog n to engage, and causing the binder to operate. When, however, the arm s is moved forward, as shown in Fig. 14, the protruding end of the dog $n$, being carried around with the clutch, will ride against the forward face of the arm and be forced inward, disconnecting the clutch from the binding mechanism, permitting the binder to stop, and causing the clutch to remain in the position represented in Fig. 14. The parts will remain in this position until the arm $s$ is again thrown backward.

For the purpose of operating the tripping devices $s$ and $t$, I mount upon a frame a horizontal rock-shaft, $u$, and provide the same at one end with a forked arm, $v$, to embrace the toggle-joint $t$, and also provide it at the opposite end with a trip-arm, $w$, extending inward over the grain-receptacle in suitable position to be acted upon from below by the accumulating gavel. The normal position of the parts is represented in the various figures. The arm $s$ being locked forward, and the trip-arm $w$ being in its depressed position, the grain accumulating within the binder-arm acts upon the arm $w$, lifting the same, and causing it, through the rock-shaft $u$, to lift the arm $v$, thereby bending or flexing the toggle-joint $t$, and moving the arm $s$ backward, so that the clutch may drive the binder. As the gavel is grasped by and compressed beneath the binder-arm, it is reduced in size and carried away from the trip-arm $w$, which is thus permitted to descend to its original position, thereby causing the toggle-joint to throw the arm $s$ forward, so that at the completion of the binding operation, which is effected by a single rotation of the clutch, the latter will be automatically disengaged and the binding devices permitted to stop.

Referring to the details of the clutch, it will be observed that the sprocket-wheel $Q'$ is provided with a large number of the recesses $p$, extending around its entire interior surface, so that the dog may engage therewith instantly and at any point during its revolution, thus causing the binder to start immediately upon the elevation of the trip-arm $w$ by the grain. It will also be observed that the recesses $p$ are made of substantially semicircular form and of a depth slightly greater than half the diameter of the roller $o$ on the dog. This arrangement permits the roller to ride into and out of the notches with ease, avoids any tendency of the same to disengage when in action, but causes it to roll or ride out automatically as soon as the dog $n$ has been moved slightly inward. It is found in practice that the clutch thus constructed will operate easily and certainly, and that it is adapted to withstand a great amount of wear without injury.

Referring next to the means for giving the vertical movement to the grain-controlling arms M and lifting-plates N, attention is directed particularly to Figs. 8 and 10. The gear-wheel $P'$, before mentioned, is provided, as shown in Fig. 10, with a cam-groove, $x$, in its side face. This groove receives a stud or roller, $y$, upon one end of a central pivoted lever, $z$, the lower end of which is connected by a link, $a'$, to the middle of an upright lever, $b'$, pivoted at its lower end. The upper end of this lever $b'$ is connected by a link, $c'$, to a crank-arm, $d'$, on one end of a horizontal rock-shaft, $e'$. This rock-shaft $e'$ extends forward above the grain-passage, and is sustained at its forward end in one of the stationary plates $D'$. At its forward end the shaft is provided with a crank-arm, $f'$, connected by a link, $g'$, to one of the arms $M'$, the latter being connected by means of a rock-shaft, $g$, to its companion. Thus it will be seen motion is transmitted from the cam-groove of wheel $P'$ through the intermediate lever and connections to the arms $M'$, which are caused to rise and fall at the proper times. The arm $b'$, through which motion is communicated, as just described, is secured at its lower end on a horizontal rock-shaft, $h'$, which is in turn provided, as shown in Figs. 4, 8, and 9, with horizontal arms $i'$, the forward ends of which have studs or rollers situated in slots in the grain-elevating plates $N'$. By this connection the same movement of the lever $b'$ which effects the depression of the arms $M'$ causes at the same time the elevation of the plates $N'$, to lift the grain above the conveyers M.

Referring next to the device by which the operation of the compressor-arm $E'$ is effected, attention is directed to Figs. 1, 2, 11, and 32. The arm $E'$ is secured rigidly to a short tubular shaft, $j'$, seated loosely on one end of a horizontal rock-shaft, $F'$, which is encircled by a spiral spring, $l'$, one end of which is secured to a fixed collar thereon, while the opposite end is attached to the shaft $j'$. This spring tends to revolve the compressor-arm downward or forward with respect to the shaft $F'$; but this forward rotation is limited by means of a stud, $k'$, upon the shaft $F'$, encountering a corresponding projection on the tubular shaft. The shaft $F'$ is provided at its rear end with a crank-arm, $m'$, connected by a link, $n'$, to a lever, $o'$. This lever, being pivoted at one end to a rigid support, is provided at its center with a lateral stud or projection, which enters a cam-groove in the gear-wheel $L'$ on the ejector-shaft, the arrangement of the parts being plainly represented in Figs. 11 and 32. The lever $o'$ and link $n'$ serve to turn the shaft $F'$ forward, and thereby apply a tension to the spiral spring $l'$, the spring in turn tending to urge the compressor-arm downward in condition to receive the pressure of the grain. The downward or forward motion of the compressor-arm is limited and the arm stopped at the proper position by means of the interlocking projections upon the two shafts $j'$ and $k'$, before referred to.

By the above-described action of the parts the compressor-arm is held downward with an elastic or yielding pressure, so that, although it acts with sufficient force to effect a proper compression of the grain, it will yield in the event of an excessive pressure, and thus prevent the parts from being subjected to injurious strains. Immediately after the binding of the bundle is completed the lever $o'$ is elevated, and through its immediate connections it revolves the shaft F' backward in such manner as to lift the compressor with a positive motion, the positive motion being communicated from the shaft F' to the shaft j' by means of their interlocking projections before mentioned.

In operating in the field with binding-machines it is frequently found that the bundles are delivered upon the ground in such position as to leave but a narrow space between them and the standing grain, the result of which is, that the machine in its next round through the field is liable to overrun and damage the bound bundles. To avoid this difficulty I provide a means of discharging the bundles from the binder in such manner that they will lie lengthwise of the field, or, in other words, in the direction in which the machine travels, thus affording the greatest possible space between them and the grain which is left standing at the side of the machine. Provision made for this purpose consists in prolonging or extending the binding-table at one end and providing the same with an upright portion adapted to engage one end of the bound bundles as they are being delivered from the machine. The form of this upright portion may be modified as desired, provided only that it is adapted to retard one end of the bundle until the opposite end has encountered the ground, whereby it is caused to place bundles lengthwise of the field. The form of the extension and upright portion herein employed is plainly represented at $s'$ in Figs. 1 and 2. It consists of a curved upright flange or guard extending around the rear edge of the binder-table, which is extended at said end slightly backward beyond the remaining portion, whereby it is adapted to sustain and hold the head of the sheaf while the remaining portion is delivered over the rear edge of the table by the ejector-arm.

Passing, now, to a consideration of the mechanism for tying the ends of the applied band together, severing the band from the main or spool portion of the cord, and retaining the newly-formed end, attention is directed more especially to Figs. 3, 8, 9, 12, and 16 to 29. The tying device is of the type commonly known in the art as "tying-bills," consisting of a rotary spindle provided at one end with two laterally-extending fingers or jaws movable the one to and from the other, the cord being twisted around the two jaws by their rotation into the form of a loop, and the ends subsequently grasped between the two jaws, and thereby drawn through the loop to complete the knot. The form of the tyer is clearly represented at $A''$, Figs. 16, 18, 19, and 20. It consists of a tubular shaft or spindle, $t'$, provided at one end with a fixed jaw or head, $u'$, the end or point of which projects at substantially right angles to the axis of the spindle. This projecting bill or jaw $u'$ is tapered toward the outer end, curved slightly forward in the path of rotation, that it may engage the more readily upon the cord, and provided with a longitudinal slot, $v'$, (clearly represented in Figs. 19 and 20,) this slot extending through the bill in the direction of the axis, or, in other words, from the inner to the outer side, its purpose being to admit the co-operating jaw or bill, which will be presently described. The extension of this slot $v'$ through the jaw from side to side is of importance, in that it permits the lint, fiber, and other matters which may lodge therein to pass through the jaw and escape from the rear side without impeding the action of the movable jaw, as they would otherwise be liable to do. The second jaw, $w'$, has a hooked or barbed end of a suitable size and form to enter the slot $v'$ in the rigid jaw, and has also at right angles to said end a spindle or shaft extended centrally within the main spindle $t'$, in which it is free to slide endwise. By this sliding motion the jaw $w'$ may be moved outward into the rigid jaw for the purpose of clamping or confining the cord therein, or drawn inward away from said rigid jaw, as indicated in dotted lines in Fig. 19, to receive and release the cord. The two concentric tyer-spindles are united by means of a transverse pin, $x'$, as shown in Fig. 19, passed through the inner spindle, and playing at its ends in longitudinal slots in the outer spindle, $t'$, whereby the two spindles and their jaws are caused to rotate in unison. For the purpose of effecting the opening and closing movement of the inner or movable jaw $w'$, the ends of the pin $x'$ are extended outward and seated in a sleeve or collar, $Z'$, which surrounds the main tyer-spindle $t'$, as shown.

The sleeve $Z'$ revolves in a semicircular seat or bearing formed in the outer side of a plate, $a''$, and is provided with circumferential flanges, which engage over the edges of the plate, as shown, so that the plate and sleeve are compelled to rise and fall together. The plate $a''$ carries on its back, as shown in Fig. 21, a stud or cam, $b''$, seated in a cam-groove, $c''$, formed in the face of a revolving gear-wheel, $B''$, as shown in Figs. 18, 19, and 22. The rotation of the gear-wheel $B''$ causes its cam-groove to slide the sleeve $Z'$ to and fro endwise upon the main tyer-spindle, and the sleeve thus operated through the connecting-pin $x'$ imparts the opening and closing motion to the jaw $w'$, and this while permitting the free rotation of the spindles.

To effect the proper action of the tying bill or head, it is necessary to impart to the same an intermitting rotary motion. For this purpose the spindle $t'$ is provided with a pinion, $d''$, driven by means of teeth $e''$, formed on the face of the wheel $B''$, before mentioned. The teeth $e''$ encircle but a portion of the face of the wheel, so that during each revolution of the said wheel $B''$ it imparts a rotary motion to the pinion and tying-bill, but during the remainder of its rotation permits the bill to remain at rest. For the purpose of locking the bill rigidly in position during the intervals when the teeth $e''$ are out of action, the wheel $B''$ is provided with a smooth peripheral flange, $f'''$, encircling that portion of its face which contains no teeth, this flange being adapted to encounter and bear against a corresponding flattened face, $g''$, on the side of the pinion $d''$, so as to hold said pinion from rotation. It will be observed that the teeth $e''$ and the flange $f'''$ act alternately upon the pinion, and constitute in connection therewith a stop-motion gear, by which the tying-bill is alternately rotated and locked. As will be hereinafter more fully explained, the tying-bill makes one complete revolution during the formation of each knot, and remains at rest during the intervening periods of time, while the gavels are being accumulated and the bands applied thereto.

Practical experience has demonstrated the fact that in the tying of the band, which is necessarily under a high degree of tension, provision must be made for slackening the cord or advancing the tyer during the tying operation, in order to prevent excessive strain upon the cord. To this end I mount my tyer-head in such manner that during the operation of winding the cord into a loop it travels bodily backward along the cord, thus taking up the cord with far less strain than would otherwise be the case. This feature of a movable tyer and the operating devices represented in the drawings for effecting such movement are not broadly claimed herein, the same having been made the subject-matter of an independent application filed July 31, 1883, No. 102,409; but inasmuch as such devices are necessary to a full understanding of other parts forming part of the present invention, said details are illustrated in the drawings, and will now be described.

I prefer to mount the tyer-spindle $t'$, as shown in Figs. 16, 18, 19, 26, and 27, in a rocking frame or support, $C''$. As shown in the various figures, this rocking frame is provided at its two sides with arms, to form bearings for the ends of the spindle, and it is also provided at the center with a tubular journal, $h''$, seated in a suitable bearing in the main frame. It will be observed that the journal of this rocking frame lies at right angles to the axis of the tyer-spindle, and that, consequently, the rocking motion of the frame causes the tying-bill to move bodily forward and backward through a vertical arc at right angles to the plane in which the bill revolves.

The rocking motion of the tyer-support may be effected by mechanism of any suitable character; but I prefer to employ in ordinary cases the simple arrangement represented in Figs. 3, 8, 9, 16, 26, and 27. The gear-wheel $B''$ has its shaft or spindle $i''$ extended through the tubular journal of the rocking frame $C''$, and receives a positive intermitting motion through mechanism hereinafter explained. To this shaft $i''$, I secure rigidly, as shown particularly in Figs. 26 and 27, a pinion, $k''$. I also extend rigidly downward from the tubular journal $h''$ of the rocking tyer-frame $C''$ an arm, $l''$, on the lower end of which I mount a second pinion, $m''$, gearing into the first-named pinion $k''$, as plainly represented. To the exposed side of the pinion $m''$, I journal one end of a link, $n''$, the opposite end of which link is journaled or pivoted to a rigid portion of the frame. The rotation of the tyer-operating shaft $i''$ imparts motion to the pinion $k''$, which in turn revolves the pinion $m''$. Now, inasmuch as this pinion $m''$ is pivoted to the link $n''$, which cannot move endwise, it follows that the pinion $m''$, in addition to the rotation which it receives about its own axis, must receive, also, a rotation bodily around the pivot by which it is united to the link $n''$. The pinion $m''$ being, however, attached to the arm $l''$, so that it cannot rise or fall, while the end of the link is free to swing vertically, it follows that the rotation of the pinion $m''$ will cause the same to impart to the end of the arm $l''$ a vibratory motion, as indicated in Fig. 26. This motion of the arm $l''$ transmits, through the tubular journal $h''$, the rocking motion to the frame $C''$, in which the tyer is mounted, moving the tyer forward and backward at the proper times, as hereinafter explained.

The intermitting rotary motion is imparted to the tyer-driving shaft $i''$ in the manner plainly represented in Figs. 12 and 16. The shaft is provided at its outer end with a beveled pinion, $o''$, having a flange, $p''$, flattened at one edge. The pinion is driven by a segmental rack, $q''$, on the inside of a wheel, $E''$, this wheel being constructed with a peripheral flange, $r''$, to act upon the flattened flange of the pinion and hold the latter at rest during the intervals between the successive actions of the rack $q''$. This combination constitutes, it will be seen, a stop-motion gear, whereby an intermitting motion is transmitted from the wheel $E''$ to the tying mechanism. The wheel $E''$ is secured on the lower end of a vertical shaft, $F''$, which latter receives motion at its upper end, as shown particularly in Fig. 12, through a pinion, $G''$, secured thereon and driven by a corresponding pinion, $H''$, secured rigidly to the side of the gear-wheel $L'$, mounted on the ejector-shaft, as before explained. The tying-bill is mounted, as shown in Figs. 3, 16, 23, 24, 25, 26, and 27, with its spindle in an upright position and its operative end immediately beneath the slotted throat-plate $I''$, through which the cord is carried downward beneath the tying-bill by the point of the binder arm or needle. As shown in Figs. 1, 4, 17, 24, and 25, the grain-table is slotted to admit of the point of the binder-arm swinging backward vertically through the same in such manner as to present its point beneath the throat-plate and slightly below the level of the tyer-bill. As shown in the same figures, a slot, $s''$, forming a continuation of that through which the binder-arm descends, extends edgewise into the throat-plate, being curved or inclined laterally out of the path of the binder-arm the better to force the cord over within the grasp of the tyer, and being at its inner end curved abruptly to one side, as shown at $t''$. It is beneath this slot that the operative portion of the tyer is located, the frame in which the tyer is mounted being arranged to carry the same forward and backward, substantially in the direction of the length of said slot.

For the purpose of retaining the newly-formed end of the cord produced by the severance of the band therefrom, I make use of a horizontal clamping wheel, $J''$. This wheel, as shown in Figs. 16, 17, 23, 24, 25, and 28, is pivoted to the swinging stripper-plate $L''$, lying horizontally against the under surface of the throat-plate $I''$, and is provided with a depending peripheral flange, $u''$, having in its under edge a number of notches or recesses, $v''$, to receive the cord, which is laid therein by the action of the binder arm or needle as it descends inward beneath the wheel, as shown in Fig. 23. For the purpose of confining the cord thus placed in the lower edge of the wheel, I provide the stripper-plate $L''$, on which the wheel is mounted, with a rigid jaw or lip, $K''$, adapted to fit over and around the notched flange of the wheel, in the manner shown in Figs. 16, 17, and 28. After the cord has been placed in one of the notches of the wheel, the latter is rotated in such manner as to force the cord into and pinch it fast within the jaw $K''$.

I do not claim as a part of the present invention the crown-wheel, either alone or in combination with the clamping-jaw, these matters being made the subject of a separate application filed January 12, 1885, No. 152,665.

I will now explain the manner in which the rotary motion is imparted to the clamping-wheel.

The wheel is provided with a series of peripheral ratchet-teeth, $z''$, acted upon at suitable intervals by means of a pawl, $a'''$, pivoted to a horizontal sliding bar, $b'''$. This bar is provided, as shown in Fig. 17, at one end with gear-teeth $c'''$, designed to engage, as shown in Figs. 3 and 27, with corresponding teeth, $d'''$, which are formed, as shown in Figs. 18, 19, and 20, on the upper side of the rocking frame $C''$, which carries the tyer-bill. Under this arrangement the rocking motion of the tyer-frame causes the bar $b'''$ to actuate the dog $a'''$ and effect an intermitting rotation of the clamping-wheel, the wheel being turned at each motion a sufficient distance to bring its next notch, in which the cord has just been placed, beneath the stationary jaw $K''$, so as to pinch and hold the ends of the cord therein. In order to cause a positive engagement of the pawl $a'''$ with the teeth of the clamping-wheel and to avoid the employment of springs, I provide the frame with a stationary shoulder, $e'''$, to bear against the rear side of the pawl as the latter advances, and give to the side face of the pawl a curvature such that as it rides forward the shoulder at its point will be caused to follow the teeth of the wheel. This action is plainly illustrated in Figs. 17 and 29.

The cutting of the cord to detach the applied band from the remaining portion is effected by means of a stationary knife, $M''$, against which the cord is carried by the clamping devices as they are moved forward by the movement of the stripper-plate $L''$, on which they are mounted. The stripper-plate is pivoted at the point $w''$, and is vibrated horizontally by the action of the arm $x''$. (Shown in Fig. 17.) During the operation of receiving and tying the cord the parts remain in the position represented in Figs. 17 and 24; but at the completion of the tying operation the stripper-plate is moved in the direction indicated by the arrows, thereby advancing the clamping mechanism toward the knife in such relation thereto that the severance of the cord is effected with certainty.

Referring, now, to the action of the stripper-plate $L''$ as such, and to its peculiar form, attention is directed to Figs. 17, 23, 24, and 25. The forward end of the plate is provided with a slot or opening to receive the cord, this slot coinciding when the plate is in its forward or normal position with the slot $s''$ in the throat-plate, but being without the lateral offset or extension at its rear end. The vibratory movement of the stripper-plate is effected by the bar $x''$, this bar being extended horizontally to the outer side of the machine, where it is slotted to encircle the vertical shaft $F'''$ and provided with a depending stud or roller, which enters a cam-groove formed in the upper side of the before-mentioned wheel $B''$, by which the tying mechanism is actuated. The cam-groove is made of such form as to cause the bar $x''$ to move the stripper-plate forward and backward at the proper intervals, and to hold it at rest during the intermediate periods.

The action of the parts is as follows: During the accumulation of the grain, and while the binder-arm is in its elevated position, the various parts stand in the position represented in Figs. 16, 17, and 24, the slot in the stripper-plate coinciding with that in the throat-plate, the jaws of the tyer lying across the forward portion of the slot in the throat-plate, and the clamping mechanism standing at a distance from the stationary knife. At this time the cord, having its extreme end held by the wheel $J''$ and its jaw $K''$, will pass thence upward beneath the tyer through the slot in the throat-plate, passing over the gavel and through the eye of the elevated binder-arm to the spool or other source of supply. While the tying devices are still at rest the binder-arm descends and, passing the cord around the bundle, presents the second end of the band thus applied downward through the slot in the throat-plate, beneath the bills of the tyer and beneath the clamping-wheel, placing it in the next notch of said wheel, which is exposed outside of the clamp $K''$. The tying-bill next commences to revolve, thereby twisting the cord laid beneath its two jaws into the form of a loop around them in a manner common in this class of tyers and familiar to those skilled in the art. During this rotary twisting action the tyer-supporting frame receives its rocking motion, causing the tyer during the formation of the loop to move bodily backward toward the cord-clamp, whereby it is caused to take up the cord as the latter winds thereon. Immediately after the rotation of the tyer commences, the inner jaw opens away from the other, and just before the completion of its revolution the two ends pass between the jaws, which immediately close thereon, retaining the ends between them, after which the rotation ceases. During the backward movement of the tyer, while the formation of the loop thereby is taking place, motion is communicated through the pawl $a'''$ to the clamping-wheel, which is caused to grasp the body or spool portion of the cord, so as to retain the same after the severance of the band. During the backward movement of the tyer above described it passes from its position near the forward end of the slot $s''$ in the throat-plate backward to a position (represented in Fig. 25) immediately beneath the rear offset end of said slot. At or about the time the tyer comes to a rest in this second position, with its bills extending in the direction of the offset portion $t''$ of the slot, the stripper-plate commences its movement toward the knife. The first result of this movement is, that the stripper-plate, acting upon the applied band beneath the tyer and the bundle, forces said cord into the offset portion $t''$ in the throat-plate, thereby forcing the finished knot positively from the jaws of the tyer. At the same or substantially the same time that this stripping action is taking place the forward motion of the stripper-plate carries the clamping-wheel toward the stationary knife, whereby the applied and fastened band is severed from the body portion of the cord and the bundle released. Immediately after the above occurrences the ejector-arm, coming into play, discharges the bound bundle from the machine, and the various parts of the tying mechanism assume their original positions.

It is to be noted as an important feature of my invention that the cord-clamping mechanism is mounted upon the movable stripper-plate and arranged to co-operate with a knife which is stationary, whereby the employment of additional mechanism to operate the knife is avoided. It will also be noted as an important feature that the clamping-wheel, being located horizontally, as shown, is enabled to grasp the cord at a point very near the gavel. Now, inasmuch as that portion of the cord between the clamp and the gavel must in every machine be taken up as slack, allowing a corresponding extension of the bundle, and necessitating a correspondingly increased compression of the bundle, in the first instance, that it may thus take up the slack by expansion, it follows that by my arrangement I am enabled to avoid excessive compression, to effect a material saving in the expenditure of power, and to present the bound grain in better form and condition than when the ordinary clamping devices are employed.

While it is preferred to retain the details substantially as represented, it will of course be understood that the mechanism for imparting the rotary and rocking motion to the tyer, the rotary motion to the clamp, and the vibratory motion to the stripper-plate may be modified, or, in other words, that constructions differing in detail, but constituting in effect the equivalent of that shown, may be employed without departing from the limits of my invention.

In order to secure the proper tipping or tilting action of the machine to vary the height of the cutter, I provide the main frame, as shown in Figs. 1 and 2, with a forwardly-extending tongue or draft-pole, $g'''$, connected to the frame by a horizonal pivot, $h'''$, and braced laterally by means of arms $i'''$, bolted to the tongue at their forward ends and jointed at their rear ends to the frame. The front and offset of the frame are preferably constructed, as shown, of a single bar of metal, $k'''$, in the peculiar form shown, the bar being bent inward and backward at the front to form a recess to admit the rear end of the tongue. On the front of the frame I mount a horizontal rock-shaft, $l'''$, provided at one end with a crank-arm, $m'''$, connected by a link to the tongue, and provided at its opposite end with an upright hand-lever, $n'''$, provided with an ordinary dog or rocking device engaging in a stationary plate or rack. By means of this hand-lever the rock-shaft and its arm may be operated and the frame thus rocked or tilted up or down at the front, the tongue being held meanwhile in a stationary position, as usual.

For the purpose of delivering the grain properly to the cutting mechanism I employ a horizontal revolving reel of substantially ordinary construction, combined with peculiar devices (represented in the drawings) whereby it may be conveniently adjusted by the driver while in his seat. These devices are not claimed as part of the present invention, as they constitute the subject-matter of an independent application filed February 6, 1884, No. 119,985.

For the purpose of insuring the passage of the grain from the main platform beneath the secondary conveyers, I attach to the inner divider—that is to say, the divider at the inner end of the cutter-bar—a backwardly-extending arm, $N''$, as shown in Fig. 1. The rear end of this arm, standing somewhat above the frame F and curved toward the outer or grain side of the machine, acts upon the heads of the falling grain and causes the same to assume the proper position upon the receiving-platform. It effectually prevents the difficulty which might otherwise be encountered by reason of the heads of the grain falling over on top of the elevated frame F.

For the purpose of adjusting the machine vertically upon the main or ground wheel, the latter has its journals mounted in the rear of a U-shaped frame, O''. The wheel is mounted between the two arms of this frame, and the frame is connected at or near its middle by horizontal journals P'' to the main frame. At its forward closed end the wheel-carrying frame is provided with a vertical rack, Q'', which engages with a pinion, R'', on a horizontal shaft, S'', said shaft being mounted in the main frame and provided with a notched wheel, T'', blocked by means of a pivoted dog, U'', on the main frame. The notched wheel is provided with holes or openings to receive a bar or lever by means of which the pinion may be turned to adjust vertically the wheel-carrying frame.

The present invention is restricted to those matters and things which are hereinafter claimed, and as to all matters which may be described or shown, but which are not claimed, the right is reserved to make the same the subject of a separate application.

I am aware that a reel-operating shaft has been extended diagonally backward across the secondary platform to the outer rear corner of the machine and combined with secondary levers, cranks, and other complicated devices for operating the reel; but my construction differs therefrom in that the lever which sustains the reel is continued directly backward within reach of the driver, thus avoiding the use of additional parts.

Having thus described my invention, what I claim is—

1. In a grain-binding machine, the combination, substantially as described, of the harvester-platform to receive the falling grain, the longitudinal conveyers to deliver the grain at the end of said platform, and the secondary endless toothed conveyer-chains arranged at an angle to the longitudinal conveyers, and acting to turn the grain to a position substantially at right angles to that in which it fell upon the harvester-platform, and the binding mechanism located in rear of said secondary conveyers, substantially as described and shown.

2. In an automatic harvesting and binding machine, the combination, substantially as set forth, of the grain-receiving platform in rear of the cutting mechanism, the endless conveyers to deliver grain in a continuous stream at the inner end of said platform, the secondary endless conveyers acting to receive and turn the grain in a backward direction at a right angle, or thereabout, to the position in which it is received, and the binding mechan's n located in rear of said secondary conveyers, and adapted, as described, to bind the grain while lying in a position at right angles, or approximately so, to the direction of the travel of the machine.

3. In a harvesting and binding machine, a table or under support for the grain, located at the inner end of the harvester-platform, combined with overhead continuously-acting conveying devices moving in curved or oblique lines, substantially as described, whereby they are adapted to act upon the grain from above and turn the same in an oblique or curved path on the table.

4. In a grain harvesting and binding machine, the combination of the grain-receiving platform, the secondary platform at its end, the conveying mechanism acting lengthwise of the receiving-platform, a second conveying mechanism, substantially as described, to turn the grain horizontally upon the secondary platform at right angles to its original position, and a third conveyer acting at right angles to the conveyers upon the receiving-platform, to carry the grain from the second conveyer directly backward.

5. The combination of the grain-receiving platform in rear of the cutters, its longitudinal conveyers, the secondary platform at the end of the receiving-platform, the secondary overhead conveyers acting to turn the grain upon the secondary platform, and the third conveying mechanism, mounted in the secondary platform and acting to carry the grain to the rear of the machine.

6. In a grain harvesting and binding machine, a grain-receiving platform, in combination with a series of longitudinal conveyer-chains provided with folding teeth, the teeth of each chain being adapted and arranged, as described, to move in an operative position toward the inner end of the machine a greater distance than those of the chain next in its rear, whereby the grain is delivered from the harvester-platform in an oblique position.

7. In a harvesting and binding machine, a horizontal grain-receiving platform in rear of the cutters, combined with a series of parallel conveyer-chains extended longitudinally therein and provided with folding teeth, and tracks or tripping devices to determine the action of said teeth, said tracks being constructed of successively decreasing length from front to rear, as described and shown, whereby the grain is given a partial rotation in a horizontal direction as it is delivered at the inner end of the receiving-platform.

8. In an automatic grain harvesting and binding machine, the series of substantially horizontal chains extended around guide-rolls having vertical axes in parallel curved lines, the conveyer-teeth pivoted to said chains to fold in a vertical direction, means, substantially as described, to effect the folding of the teeth as they travel in one direction and their projection as they travel in the opposite direction, and mechanism to drive said chains at different speeds, whereby they are adapted to advance the grain with a turning motion and disengage therefrom.

9. In a harvesting and binding machine, a series of horizontal chains moving in curved paths about a common center, rising and falling teeth pivoted to said chains, and stationary tracks acting upon said teeth to control their pivotal motion, whereby the grain may be moved positively with a turning motion in a horizontal direction.

10. In combination with a horizontal grain table or support, a flat frame suspended above and parallel therewith, and a series of endless chains moving in curved lines in or upon the under side of the elevated frame and provided with depending automatically-folding teeth, substantially as described.

11. In combination with the grain platform or support, the overhead frame provided with conveying-chains having depending teeth to act upon the grain and adjustable in a horizontal direction, as described, whereby the delivery of the grain at different points as regards its longitudinal adjustment may be effected.

12. In combination with a grain platform or support and an elevated frame mounted above the same in position to leave an intermediate grain-passage, a series of conveying-chains mounted upon the elevated frame and provided with depending teeth, said chains arranged to move in substantially the arcs of circles described from a given center, and combined with mechanism whereby they are driven at different speeds, substantially as described, whereby the teeth acting at one end of the grain are caused to move at a greater speed than those at the other, and thus the grain is turned horizontally in the arc of a circle.

13. In a harvester and binder, the combination, substantially as hereinbefore described and shown, of the series of conveying-chains, mechanism for guiding their path of movement, whereby they are adapted to move concentrically in the arcs of circles, or substantially so, the folding teeth applied thereto, and the mechanism for imparting to the respective chains differential speed.

14. In combination with a series of conveyer-chains moving in concentric curved paths, or substantially so, the central revolving head provided with teeth to act upon the grain, and thus co-operate with the chains in turning the same.

15. In combination with a series of conveyer-chains moving in curved lines, a frame provided with supporting-pulleys for such chains, and a system of gearing, substantially such as shown, connecting the pulleys of the several chains with each other, and adapted to effect a movement of the various chains at different speeds.

16. In combination with a pivoted horizontal swinging frame, a series of conveyers moving in curved lines thereon, and means, substantially as described, whereby the operator may adjust and secure said frame at will.

17. In combination with a grain platform or support, the overhead frame F, provided with conveyer-chains, and having its receiving-edge inclined upward on the under side, whereby it is adapted to assist in compressing the grain and guiding it beneath the conveyers.

18. In combination with a grain-supporting platform and the elevated frame provided with conveyers on its under side, the overhead bar S, extending across the harvester from front to rear and sustained by upright supports, and a sliding connection, substantially as described, between said bar and the elevated frame.

19. In combination with a grain-supporting platform, a horizontally-adjustable frame overlying the platform, and provided with a depending flange or guard to act against the ends of the grain, and conveying mechanism to advance the grain beneath said elevated frame.

20. The quadrantal frame adjustable horizontally and provided with the depending guard on its curved edge, combined with the conveying-chains moving in curved lines in or upon the under side of said frame, as described, whereby the grain is revolved horizontally and its longitudinal position determined by the action of the flange thereon.

21. In combination with a grain platform or support, the quadrant-frame overlying the same, and having a space thereunder for the passage of the grain, provided on its curved edge with a depending flange, pivoted at its forward end and provided with conveyer mechanism upon its under surface, substantially as shown.

22. In combination with a grain platform or support and conveying mechanism to turn the grain horizontally thereon, the overhead horizontally-adjustable frame provided with a depending curved guard, said guard having its end extended rearward beyond the frame, as and for the purpose described.

23. The elevated transverse bar S, extending from front to rear and supported by uprights at its ends, in combination with the elevated frame F and the rigid journal or pivot for said frame, mounted upon the main frame, and sustained at its upper end by a bearing secured to the bar S.

24. In a combined harvesting and binding machine, the combination of the grain-receiving platform and the conveying mechanism acting lengthwise thereof, the secondary platform, the secondary conveying mechanism to turn the grain horizontally, the conveyers M, acting fore and aft of the harvester, the grain-binder located in rear of said conveyers M, and means to lift the grain clear of the last-mentioned conveyers, substantially as described.

25. The grain-receiving platform and the supplemental platform at its end, in combination with the continuously-acting conveyers extending longitudinally of the harvester-frame, and secondary conveyers acting continuously to turn the grain upon the secondary platform, the conveying mechanism M, acting to carry the grain to the rear, the vertically-movable plates N', and means, substantially as described, for automatically elevating said plates above the conveyer during the operations of compressing and binding the grain.

26. The binding-table or grain-receiver, in combination with the overhanging standard A', the two vertical plates D', secured rigidly in position, as described, to act upon the grain from above, and the vertically-moving binder-arm located between said plates.

27. The binding-table or grain-receiver, in combination with the overhanging standard, the binder-arm, and the two fixed vertical plates D', located on opposite sides of the binder-arm, with their lower edges adapted, as described, to assist in compressing and confining the grain beneath them.

28. In combination with a grain table or receiver, an elevated plate, D', to act upon the gavel from above, the vertically-swinging binder-arm, substantially as described, and the vertically-movable arms M, and means, substantially as described, for raising said arms during the depression of the binder-arm, and vice versa, whereby an increased space is afforded for the reception of the grain delivered against the outside of the binder-arm during the compression of the gavel.

29. In combination with the binding mechanism, the conveyers M, the vertical -movable plates N', the vertically-movable arms M', and mechanism for imparting to said parts the relative movements described.

30. In combination with the binding-table or receiver and the fixed plate or plates D, overhanging the same, the vertically-vibrating binder-arm, the rotary ejector-arm having a common center with the binder-arm, and the pendent compressor-arm vibrating about a separate center, as described.

31. In a binding mechanism, the combination of two elevated fixed plates, D', with the binder-arm and the ejector-arm, both located and arranged to move between said plates.

32. The ejector-arm constructed in a U form, as described, and connected at its open end to the operating-shaft, as described.

33. In combination with the U-shaped compressor-arm, sustained at its open end on the outside, the ejector-arm arranged to pass through the open end of the compressor past the shaft or axis thereof, whereby the support of the compressor is prevented from interrupting the movement of the ejector.

34. In combination with the standard or support, the tubular shaft having the ejector thereon, the central shaft having the binder-arm attached, and mechanism, substantially as described, whereby an intermitting rotation is imparted to the ejector in one direction only and a vibratory motion imparted to the binder-arm.

35. In combination with the concentric shafts carrying the ejector-arm and the binder-arm, the shaft $m$, connected by gearing with the ejector-shaft and provided with a short crank, V', connected by a pitman with a long crank, T', upon the binder-arm shaft, whereby the rotation of the shaft $m$ is caused to impart a rotary motion to the ejector and a vibratory motion to the binder-arm.

36. In combination with the shaft having the ejector-arm thereon, the rock-shaft $k'$, the driving-wheel L', secured to the ejector-shaft and provided with a cam-groove in its side face, and the lever operated by means of said cam-groove and connected with the compressor-shaft, substantially as described, whereby the wheel L' is caused to impart motion both to the ejector and the compressor.

37. In combination with the vertically-movable plates N' and the vertically-movable arms M', the wheel P', provided with a cam-groove, and the lever connection, substantially as described, connecting said wheel with both the arms M and plates N', whereby the simultaneous elevation of the plates and arms is effected.

38. In combination with a harvesting and binding mechanism, the intermediate rotary driving-clutch W', having its parts united by the radially-moving dog $n$, the movable arm $s$, whereby the dog is forced inward, the toggle-joint $t$, connected with said arm, and the arm $w$, arranged in position to be acted upon by the accumulating gavel, and connected, substantially as described, with the toggle $t$, whereby the pressure of the gavel is applied to retract the arm $s$ and permit the dog of the clutch to move radially into engagement.

39. In a grain-binder, the binder-driving clutch provided with the radially-moving dog or pawl, in combination with the movable arm $s$ and devices, substantially as described, to lock said arm normally forward in the path of the dog, that it may disengage the same, the trip-arm arranged to be actuated by the pressure of the gavel, and intermediate mechanism, substantially as described, by which the trip-arm is enabled to move the arm $s$ momentarily out of the path of the dog, whereby the arm $s$ is caused to stop and start the binder and arrest the parts in a fixed position.

40. In a grain-binder, the driving-clutch consisting of a loose driving-wheel having a radially-movable dog with a side roller thereon, combined with a driven wheel fast to its shaft, having internal teeth adapted, as described and shown, to engage the roll and present thereto radial faces extending inward past the center of the roll, whereby the roll is permitted to engage firmly and the driving strain caused to assist in the disengagement of the roll after the initial movement of the dog has taken place.

41. In combination with the cord-clamping wheel, the binder arm or needle, the rotary tying-bill, and the rocking frame or support for said bill, arranged to move in a plane parallel with that in which the binder-arm is moved, whereby the tyer is caused to move bodily in the direction of the length of the cord.

42. In combination with the cord-retaining devices, a binder arm or needle, a rotary tying-bill, a frame wherein the tying-bill is supported, adapted to move the bill in the direction of the length of the cord, and a stationary throat-plate located between the tying-bill and the gavel, and slotted, as described, to retain the ends of the applied band in position to be acted upon by the tyer during its rotation and its movement along the cord.

43. The combination, substantially as described, of the tubular spindle $t'$, a fixed jaw thereon, the movable jaw having its shaft or spindle arranged to slide within the tubular spindle, the external sleeve, $z'$, the plate or saddle $a''$, and the cam for imparting motion to said plate, whereby the opening and closing of the movable jaw is effected without restricting the rotation of the spindles and jaws.

44. In combination with the tubular spindle provided with the jaw and the pinion $d''$, constructed as described, the internal spindle provided with the movable jaw, the external sleeve, $z'$, the plate or saddle $a''$, and the wheel B″, constructed, as described, with a cam-groove to actuate the plate $a''$, and with the teeth and flange to impart an intermitting rotation to the pinion $d''$, whereby the tying-bill is given an intermitting rotation and its jaws opened and closed at the proper intervals.

45. In combination with the movable tyer-support, the rotary cord-clamping wheel, the actuating-dog $a'''$, and its supporting-bar $b'''$, the latter connected with and operated by the movable tyer-support, substantially as described.

46. In combination with the cord-clamping wheel J″, the actuating-dog $a'''$, and its bar $b'''$, the shoulder $e'''$ on the stationary frame, arranged to co-operate with the dog, as described, whereby the dog is thrown positively into engagement with the wheel and the usual springs avoided.

47. The combination of a bed or plate, on one side of which the gavel is bound, with a cord-clamping crown-wheel applied flatwise against the opposite side of said plate, said clamping-wheel having cord-receiving notches in its annular flange, whereby it is adapted to receive and retain the cord at a point in close proximity to the gavel.

48. In combination with the slotted plate interposed between the gavel and the tying mechanism, the rotary tying-bill located upon said plate, the cord-clamping crown-wheel applied flatwise to said plate and adapted to receive the cord in notches in its annular flange, and the binder-arm adapted, as described, to pass the cord across the bills of the tyer and transversely across the face of the clamping-wheel, as described and shown.

49. In combination with the throat-plate having the slot $s''$, with the offset rear end $t''$, the vibratory stripper-plate, the rotary tyer, and means, substantially as described, whereby said tyer is caused to move toward the holder during the tying operation lengthwise of the slot in the throat-plate until beneath the offset portion therein, and the stripper-plate vibrated while the tyer is in such position, whereby the taking up of the cord by the tyer and the removal of the completed knot therefrom are effected.

50. In combination with the tyer-operating shaft $i''$ and its stop-motion pinion $o''$, constructed as described, the stripper-operating bar $x''$, the wheel E″, provided with the toothed section and delay surface to operate the pinion, and with the cam-groove to operate the bar, as described.

51. In a grain-binder, the binding-table having at one end a rearward extension provided with an upright member to engage the bound bundles at one end, in combination with an ejector-arm adapted to carry the bundles outward past said arm, whereby the bundles are turned and delivered lengthwise of the field.

52. In combination with a grain-binding table and an ejector-arm, substantially as described, the backward extension located at one end of the table and provided with an upright horizontally-curved guard or extension.

53. In combination with the horizontally-adjustable frame F, provided with conveyer-chains, a journal or pivot around which said frame is free to move, and a driving-pulley for said chains having its shaft arranged concentric with the journal of the frame.

54. In combination with a swinging frame, F, and its conveyer-chains, the tubular journal G, to sustain said frame, and the chain-driving shaft extended through said journal.

55. In combination with the harvester-frame, the overhead bar S, the horizontally-adjustable frame F, and the journal for said frame, secured at its lower end to the main frame, and sustained at its upper end by means of a box or bearing applied to the bar S, as shown.

56. In combination with the main platform, the secondary platform, and the elevated frame F, provided with the secondary conveyers, the arm N″, extending from the inner end of the cutter-bar backward, as described, whereby the passage of the grain in a proper manner beneath the frame F is secured.

JAMES F. GORDON.

Witnesses:
  N. C. WATSON,
  ADELBERT CRONISE.